(12) United States Patent
Morimoto et al.

(10) Patent No.: US 7,715,022 B2
(45) Date of Patent: May 11, 2010

(54) APPARATUS AND METHOD FOR MEASURING SHAPE

(75) Inventors: Tsutomu Morimoto, Kobe (JP); Eiji Takahashi, Kobe (JP); Masato Kannaka, Kobe (JP)

(73) Assignee: Kabushiki Kaisha Kobe Seiko Sho (Kobe Steel, Ltd.), Hyogo (JP)

( * ) Notice: Subject to any disclaimer, the term of this patent is extended or adjusted under 35 U.S.C. 154(b) by 182 days.

(21) Appl. No.: 11/707,151

(22) Filed: Feb. 16, 2007

(65) Prior Publication Data
US 2007/0195314 A1 Aug. 23, 2007

(30) Foreign Application Priority Data

Feb. 23, 2006 (JP) ............................. 2006-046997
Nov. 15, 2006 (JP) ............................. 2006-309529

(51) Int. Cl.
*G01B 11/24* (2006.01)
*G01B 11/30* (2006.01)

(52) U.S. Cl. ..................... 356/612; 356/237.2; 356/601
(58) Field of Classification Search ... 356/237.1–237.5, 356/445, 601, 612, 626–629, 634–635; 382/145–152
See application file for complete search history.

(56) References Cited

U.S. PATENT DOCUMENTS

| | | | |
|---|---|---|---|
| 5,446,549 A | | 8/1995 | Mazumder et al. |
| 5,570,186 A | * | 10/1996 | Satzger et al. ............... 356/613 |
| 6,317,204 B2 | | 11/2001 | Haga et al. |
| 6,617,602 B2 | * | 9/2003 | Kodama et al. ........ 250/559.36 |

FOREIGN PATENT DOCUMENTS

| | | |
|---|---|---|
| DE | 4003983 C1 | 2/1990 |
| DE | 10217068 A1 | 4/2002 |
| DE | 102004020419 B3 | 4/2004 |
| JP | 10-267636 | 3/1997 |

OTHER PUBLICATIONS

"Measuring Apparatus of Edge-Notch Shape of Wafer". *Electronic Materials*. Aug. (1997) in Japanese abstract in English.
Office Action from the German Patent and Trademark Office dated Feb. 20, 2009 in English and German.
Arthur Sanderson et al., "Structure Highlight Inspection of Specular Surfaces", IEEE Transactions on Pattern Analysis and Machine Intelligence, vol. 10, No. 1, Jan. 1988, pp. 44-55.

* cited by examiner

*Primary Examiner*—Tarifur Chowdhury
*Assistant Examiner*—Michael Lapage
(74) *Attorney, Agent, or Firm*—Stites & Harbison PLLC; Juan Carlos A. Marquez, Esq.

(57) ABSTRACT

A shape measuring apparatus and a shape measuring method suited for measuring an edge profile of a thin sample such as a semiconductor wafer or the like is provided. A distribution of surface angle and an edge profile of a measurement site is calculated by emitting light at sequentially different angle to the measurement site of a wafer by sequentially switching and lighting a plurality of LEDs each disposed at one of plurality of positions in one plane by an LED driving circuit, obtaining an image data showing a luminance distribution of the reflected light form the measurement site through a camera by a calculator each time light is emitted and, estimating an emitting angle of the light when the luminance of the reflected light becomes peak based on image data and emitting angle of the light corresponding to each LED by the calculator.

18 Claims, 11 Drawing Sheets

CORRESPONDING RELATIONSHIP BETWEEN LIGHT EMITTING ANGLE
AND REFLECTED LIGHT LUMINANCE AT THE POSITION OF Xj

BEFORE FITTING

AFTER FITTING

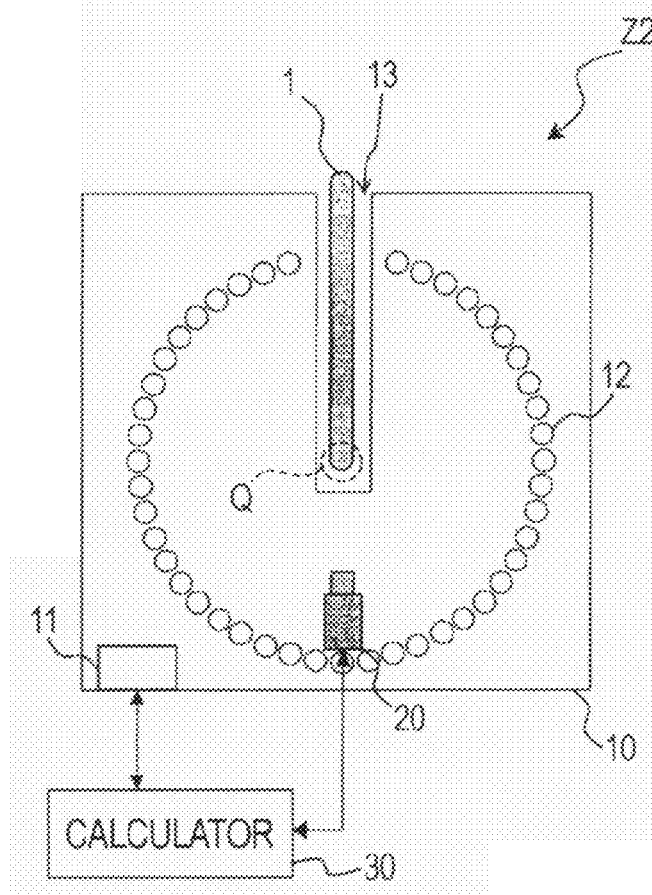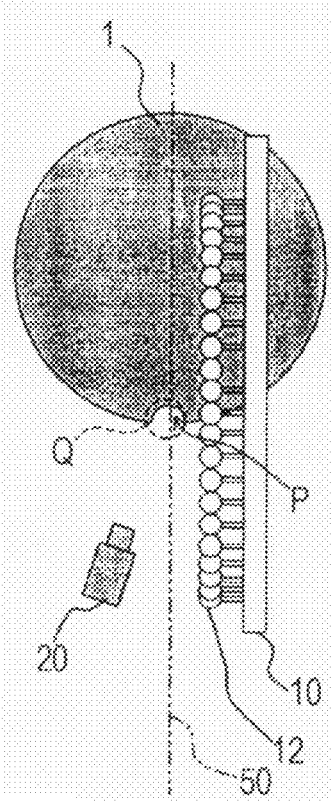

APPARATUS AND METHOD FOR MEASURING SHAPE

BACKGROUND OF THE INVENTION

1. Field of the Invention

The present invention relates to a shape measuring apparatus and a shape measuring method for measuring a shape of an edge surface of a thin sample such as a semiconductor wafer, an aluminum substrate or glass substrate for a hard disc, or the like.

2. Description of the Related Art

An edge (marginal portion) of a wafer may be damaged or cracked during manufacturing of a semiconductor wafer or during manufacturing of a device using a wafer by contacting another part or a wafer holding member. Moreover, due to the damage or crack thereof, the wafer may be broken. It is considered that the occurrence of the damage or crack of the edge of the wafer relates to a shape of the edge of the wafer. Therefore, it is important to measure an edge profile of a thin sample (plate-like sample), an example of which is a wafer. Note that a shape of an edge surface described here refers to a profile of a wafer in the thickness direction (one-dimensional direction), that is a shape of a thickness direction cross section, and hereinafter referred to as an edge profile.

On the other hand, a technique is disclosed in ""measuring apparatus of edge-notch shape of wafer" electronic materials, 1997 August issue" (hereinafter, referred to as "Non-Patent Document 1") in which a light is emitted from one side of a wafer among both sides between which a marginal portion of the wafer is sandwiched, an image of a projection image of the wafer is taken by a camera disposed at another side, and an edge profile of the wafer is measured by the shape (outline) of the image obtained thereby.

Further, in Japanese Unexamined Patent Application Publication No. 10-267636 (hereinafter, referred to as "Patent Document 1"), a surface inspection device is disclosed in which a light is emitted toward a surface (mirror surface) of a sample while changing an angle of the sample, an image of the reflected light reflected only in the coaxial direction with respect to the emitting direction is obtained through a telecentric lens, and an angle distribution of a surface of the sample, that is a shape of a surface of the sample is measured from the obtained image.

However, in the shape measuring of a projection type as shown in Non-Patent Document 1, there is a problem in that an edge profile can not be measured in the case where a measurement site for the edge profile has a dimple shape where projection light (emitted light) will not reach. For example, a cutout portion of a hemicycle so called a notch indicating a crystal orientation of a wafer is formed therein. However, the edge profile of the notch portion can not be measured in the shape measurement of the projection type disclosed in Non-Patent Document 1.

In addition, as disclosed in Patent Document 1, the measurement in which reflected light reflected in the coaxial direction with respect to the emitting direction of light is detected while changing an angle of a sample is applied to the measurement of a small surface angel distribution caused by a small concavity and convexity of a surface of a sample. When the measurement technology shown in Patent Document 1 is applied to measurement of edge profile, inclination of the sample needs to be changed each time light is emitted to a plurality of measurement points at which surface angle is to be obtained. Therefore, there is a problem in that it is difficult as a matter of practice to apply the measurement technique disclosed in Patent Document 1 to the measurement of the edge profile in which a shape having surface angles which varies approximately 180° is measured, because there are disincentives, for example, a support mechanism for a sample becomes complicated.

Accordingly, the present invention has been made in the light of the circumstances described above, and is aimed at providing a shape measuring apparatus and a shape measuring method suited for measuring an edge profile (a cross section shape of an edge surface in thickness direction) of a thin sample such as a semiconductor wafer or the like.

SUMMARY OF THE INVENTION

Accordingly, it is an object of the present invention to provide a shape measuring apparatus for measuring, for example, a shape of an edge of a thin sample and equipped with characteristic elements (1) to (4) as described below.

(1) First light emitting means for emitting light at sequentially different emitting angles with respect to a measurement site which is an edge surface of the thin sample by lighting a light source at each of a plurality of positions in one plane.

(2) First light detecting means for detecting a one-dimensional or two-dimensional luminance distribution of light emitted by the first light emitting means and reflected at the measurement site in approximately specular direction at a predetermined position.

(3) Reflected light luminance obtaining means for obtaining a luminance distribution of the reflected light from the measurement site through the first light detecting means each time light is emitted at sequentially different emitting angles by the first light emitting means.

(4) Surface angle distribution calculating means for calculating a distribution of a surface angle of the measurement site (that is, a cross section surface angle distribution of an edge surface in thickness direction) based on the luminance distribution of the reflected light obtained by the reflected light luminance obtaining means and the emitting angle of the light emitted by the first light emitting means.

The utilization of the shape measuring apparatus equipped with the configuration described above allows measurement of a distribution of a surface angle of a thin sample such as a semiconductor wafer or the like and allows accurate measurement of an edge profile (a cross section shape of an edge surface in thickness direction) based on the distribution of the surface angle. Further, edge profile can also be measured as for an edge surface having the dimple shape such as a notch portion of a semiconductor wafer.

That is, in the shape measuring apparatus provided with the above described configuration, in a luminance distribution of reflected light obtained by the reflected light luminance obtaining means, a luminance of a portion at which the light emitted to an edge surface of a thin sample is regularly reflected and reached to the light detecting means becomes most high. Accordingly, the surface angle distribution calculating means enables to obtain the distribution of the surface angle of the measurement site based on the property of specular reflection in which incidence angle and reflected angle of light is same. The detail thereof will be described later.

It should be noted here that a lighting position of the light source in the first light emitting means and a disposed position of the first light detecting means may be respectively positioned in approximately the same plane or may be respectively positioned in different planes.

Incidentally, when a change width (modification width) of emitting angle of light by the light emitting means is sufficiently reduced, a distribution of the surface angle of the measurement site can be calculated at high special resolution by obtaining a position in which a luminance of reflected light becomes most high each time emitting angle of light is changed. However, there is a limit to reduce the change width of the emitting angle of the light. In addition, as the change width of emitting angles of the light is reduced, number of times for obtaining the luminance distribution of the reflected light is increased, which requires a long measurement time. Further, the amount of data which should be obtained by the reflected light luminance obtaining means is increased, which increases required memory capacity.

Consequently, it is preferable that the surface angle distribution calculating means calculates the surface angle of each of calculating object positions by performing calculation for estimating the emitting angle of the light when a luminance of the reflected light is peak based on corresponding relationship between the emitting angle of the light and the luminance of the reflected light as for each of the plurality of positions (hereinafter, referred to as calculation object position) in a light detecting range of the first light detecting means in the shape measuring apparatus. Here, the estimation value of the emitting angle of the light at which a luminance of the reflected light becomes peak can be obtained, for example, by an interpolation calculation process based on a corresponding relationship between the emitting angle of the light and the luminance of the reflected light.

Thereby a distribution of a surface angle of a measurement site can be calculated at high special resolution even when a change width of an emitting angle of light is comparatively large.

Here, two examples are considered as for a configuration of the first light emitting means.

The first example is move type light emitting means which emits light at sequentially different angles to the measurement site by sequentially moving a predetermined light source to each of a plurality of positions in the one plane and lighting the light source.

The second example is switch type light emitting means which emits light at sequentially different angles to the measurement site by sequentially switching and lighting a plurality of light sources each disposed at one of a plurality of positions in the one plane. When the switch type light emitting means is employed, it is preferable that the plurality of light sources in the switch type light emitting means are disposed on a circular arc of which a disposed position of the measurement site is the center. According to the configuration, a device which has no moving mechanism, which is simple, and which has high positioning accuracy can be provided.

Incidentally, when a CCD camera or the like is used as for the light detecting means, a detecting range of light is limited in the one light detecting means. The limitation causes the limitation of maximum range of surface angle which can be measured in the edge profile measurement.

Consequently, it is preferable that the shape measuring apparatus includes a plurality of the first light detecting means each disposed in a different direction with respect to the measurement site and the surface angle distribution means includes part surface angle distribution calculating means which calculates a distribution of the surface angle of a part region of the measurement site based on the luminance distribution of the reflected light and the emitting angle of the light for each luminance distribution of the reflected light obtained through each of the plurality of the first light detecting means and combining calculation means for calculating a distribution of the surface angles of the whole measurement site by combining calculated result calculated by the part surface angle distribution calculating means. For example, the shape measuring apparatus in which two of the first light detecting means are disposed in directions making approximately 90° with respect to the measurement site is considered.

Thereby, maximum range of surface angle which can be measured in edge profile measurement can be spread beyond the limitation of the light detecting range by the one first light detecting means.

Further, when the shape measuring apparatus includes a plurality of the first light detecting means and the switch type light emitting means, it is preferable that in the process where the switch type light emitting means sequentially switching and lighting the plurality of light sources, a plurality of light sources corresponding to each of the plurality of the first light detecting means are simultaneously lighted.

Thereby, measurement time can be reduced.

The shape measuring apparatus described above enables to calculate a shape (surface angle distribution) of a measurement site when the measurement site (edge surface of a thin sample) has a mirror surface or a surface of gloss such like a mirror surface (to which emitted light is regularly reflected).

Incidentally, an edge surface of a thin sample such as a semiconductor wafer and the like basically has a rough surface at which emitted light is hardly regularly reflected (mostly diffusely reflected) and becomes a mirror surface or a surface of gloss such like a mirror surface after processing (polishing). Then, there is a case where the shape (edge profile) of the edge surface of the thin sample having a rough surface needs to be measured in order to grasp a required processing amount (polishing amount) and the like. However, it is impossible to measure the shape of the edge surface of the thin sample having a rough surface with the shape measuring apparatus described above.

Accordingly, it is preferable that the shape measuring apparatus according to the present invention further includes elements (5) to (7) as shown below.

(5) Second light emitting means for emitting sheet light with respect to the measurement site.

(6) Second light detecting means for detecting a two-dimensional luminance distribution of the light emitted by the second light emitting means and reflected at the measurement site in a direction except the specular direction (that is, diffusely reflected light).

(7) Light cutting method shape calculating means for calculating a surface shape of the measuring site by calculation of a light cutting method on the basis of a result detected by the second light detecting means.

Generally, the known light cutting method is not suited for the measurement of a surface shape having a mirror surface but is suited method for the measurement of a surface shape having a rough surface. Accordingly, the shape measuring apparatus according to the present invention makes it possible to measure a surface shape whether the edge surface of a thin sample (measurement site) is a gloss surface or a rough surface by including the elements (5) to (7) described above.

In this case, for simple apparatus structure, it is preferable that the first light detecting means which detects a two-dimensional luminance distribution doubles as the second light detecting means.

Further, it is preferable that the second light emitting means emit sheet light in a plane including a cross section of the thickness direction of the thin sample in the measurement site, and a lighting position of the light source of the first light emitting means is positioned at one side and a disposed position of the first light detecting means is positioned at another side among both sides of the plane including the sheet light.

Thereby, a line shown by the sheet light on a surface of the measurement site P becomes linear which follows just the outline (surface shape) of the cross section of the thickness direction of the thin sample in the measurement site. As a result, a surface shape of the thickness direction of the thin sample in the measurement site (edge surface) can be obtained at high accuracy with the light cutting method shape calculating means.

Further, it is preferable that the shape measuring apparatus according to the present invention further includes first adoption discrimination means which discriminates that which one of a calculated result of the distribution of the surface angle of the measurement site calculated by the surface angle distribution calculating means or a calculated result of the surface shape of the measurement site calculated by the light cutting method shape calculating means is adopted for shape evaluation of the measurement site based on a luminance detected by the first light detecting means while light is being emitted by the first light emitting means.

For example, it is preferable that the first adoption discrimination means discriminates whether a predetermined number of strip-shaped image is included or not in the image based on the luminance detected by the first light detecting means while the one or the plurality of light sources of the first light emitting means is being lighted and discriminates that which one of the calculated results is adopted according to the discriminated result.

Similarly, it is preferable that the shape measuring apparatus according to the present invention further includes second adoption discrimination means which discriminates that which one of a calculated result of the distribution of the surface angle of the measurement site calculated by the surface angle distribution calculating means or a calculated result of the surface shape of the measurement site calculated by the light cutting method shape calculating means is adopted for shape evaluation of the measurement site based on a luminance detected by the second light detecting means while light is being emitted by the second light emitting means.

For example, it is preferable that the second adoption discrimination means discriminates whether a continuing linear image is included or not in a predetermined range in the image basis on the luminance detected by the second light detecting means while sheet light is being emitted by the second light emitting means and discriminates that which one of the calculated results is adapted according to the discriminated result.

In the shape measuring apparatus equipped with any one of the first adoption discrimination means and the second adoption discrimination means, whether the surface of the measurement site is a gloss surface (a surface at which emitted light is mostly regularly reflected) for which shape measuring with the surface angle distribution calculating means is possible or a rough surface (a surface at which emitted light is mostly diffusely reflected) for which shape measuring with light cutting method shape measuring means is possible can be automatically discriminated, and adoption of appropriate calculated result can be automatically discriminated in accordance with the state of the surface of the measurement site. As a result, user is saved the trouble of changing over measurement content and calculation content in accordance with the state of the measurement site.

For example, when a predetermined means discriminates that the calculated result of the surface shape of the measurement site with the light cutting method shape calculating means is adopted to a shape evaluation of the measurement site by the first adoption discrimination means or second adoption discrimination means, it is preferable that the performance of the processing by the reflected light luminance obtaining means and the surface angle distribution calculating means is omitted to perform the processing with the light cutting shape measuring means or the like.

Further, the present invention can be treated as a measurement method corresponding to a measurement method using the measurement apparatus described above.

That is, a shape measuring method for measuring a shape of an edge of a thin sample including each process (1) to (4) as described below.
(1) A first light emitting process for emitting light at sequentially different emitting angles with respect to a measuring site which is an edge surface of a thin sample.
(2) A first light detecting process for detecting a one-dimensional or two-dimensional luminance distribution of reflected light emitted in the first light emitting process and reflected at the measurement site in approximately specular direction by light detecting means at a predetermined position.
(3) A reflected light luminance obtaining process for obtaining a luminance distribution of the reflected light from the measurement site by performing the first light detecting process each time light is emitted at sequentially different emitting angles by the first light emitting process.
(4) A surface angle distribution calculating process for calculating a distribution of a surface angle of the measurement site based on the luminance distribution of the reflected light obtained by the reflected light luminance obtaining process and the emitting angle of the light emitted in the first light emitting process.

Further, it is preferable that the shape measuring method according to the present invention includes each process (5) to (7) as described below.
(5) A second light emitting process for emitting sheet light to the measurement site by predetermined light emitting means.
(6) A second light detecting process for detecting a two-dimensional luminance distribution of the light emitted in the second light emitting process and reflected at the measurement site in a direction except the specular direction by light detecting means.
(7) A light cutting method shape calculating process for calculating a surface shape of the measurement site by calculation of a light cutting method based on a result detected in the second light detecting process.

In this case, it is further preferable that the shape measuring apparatus according to the present invention includes any one of process (8) and (9).
(8) A first adoption discrimination process which discriminates that which one of a calculated result of the distribution of the surface angle of the measurement site calculated in the surface angle distribution calculating process or a calculated result of the surface shape of the measurement site calculated in the light cutting method shape calculating process is adopted for shape evaluation of the measurement site based on a luminance detected in the first light detecting process while light is being emitted in the first light emitting process.
(9) A second adoption discrimination process which discriminates that which one of a calculated result of the distribution of the surface angle of the measurement site calculated in the surface angle distribution calculating process or a calculated result of the surface shape of the measurement site calculated in the light cutting method shape calculating process is adopted for shape evaluation of the measurement site based on a luminance detected in the second light detecting process while light is being emitted in the second light emitting process.

Adoption of the shape measuring method having each process described above allows obtaining the same effect as the shape measuring apparatus according to the present invention.

According to the present invention, an edge profile of a thin sample such as a semiconductor wafer can be accurately measured. Moreover, an edge profile can be measured also for an edge surface having the dimple shape such as a notch portion or the like of a semiconductor wafer. Further, a shape can be measured whether measurement site (edge surface) is a gloss surface or a rough surface by further having means or process for performing shape measurement of an edge surface of a thin sample by light cutting method.

BRIEF DESCRIPTION OF THE DRAWINGS

FIGS. 15A and 15B are each a configuration diagram schematically showing a shape measuring apparatus Z2 which is a second application example of the shape measuring apparatus Z;

DESCRIPTION OF THE PREFERRED EMBODIMENTS

Hereinafter, embodiment of the present invention will be described with reference to the accompanying drawings to provide the understanding of the present invention. It should be noted here that the embodiments described below are examples that embody the present invention and the technical scope of the invention is not limited thereto.

Figure 1A:
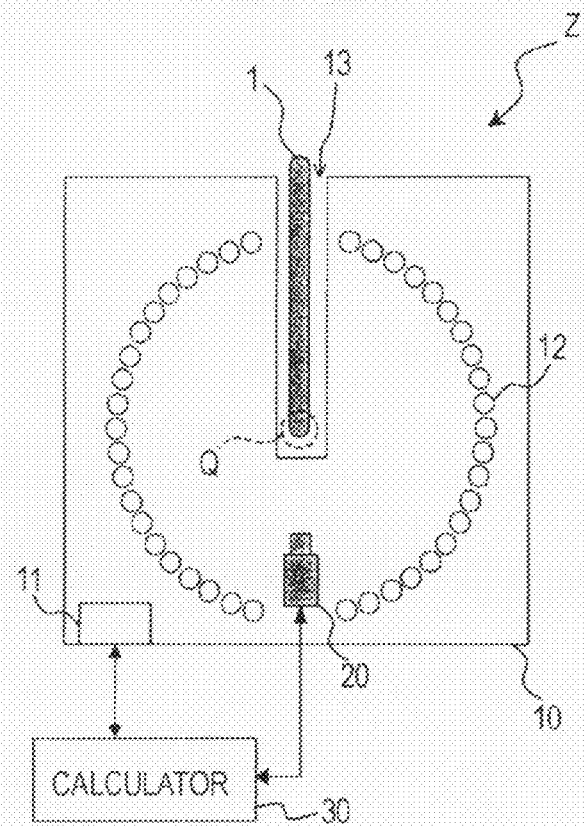
FIGS. 1A and 1B are each a configuration diagram schematically showing a shape measuring apparatus Z according to an embodiment of the present invention.
Figure 1B:
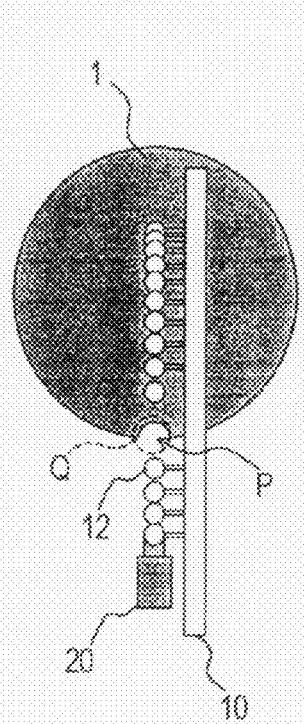
Figure 2A:
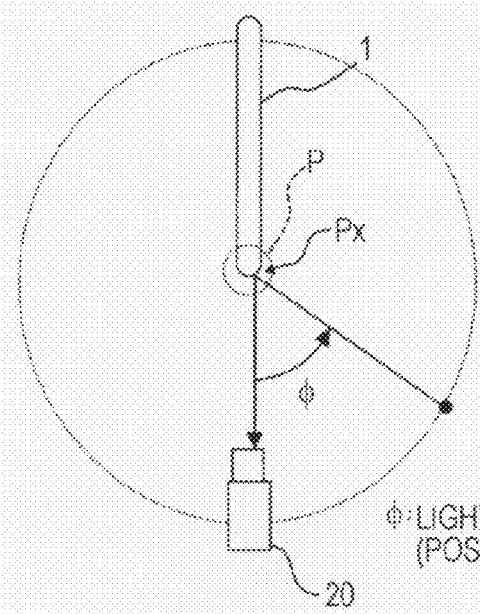
FIG. 2A is a diagram illustrating a definition of light emitting angle.
Figure 2B:
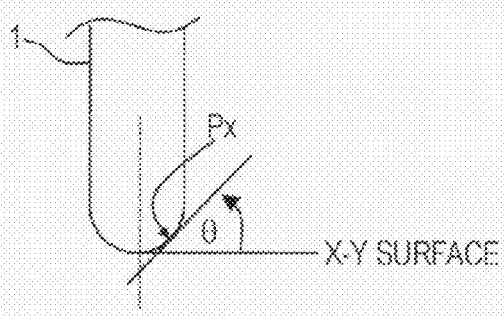
FIG. 2B is a diagram illustrating a definition of surface angle.
Figure 3:
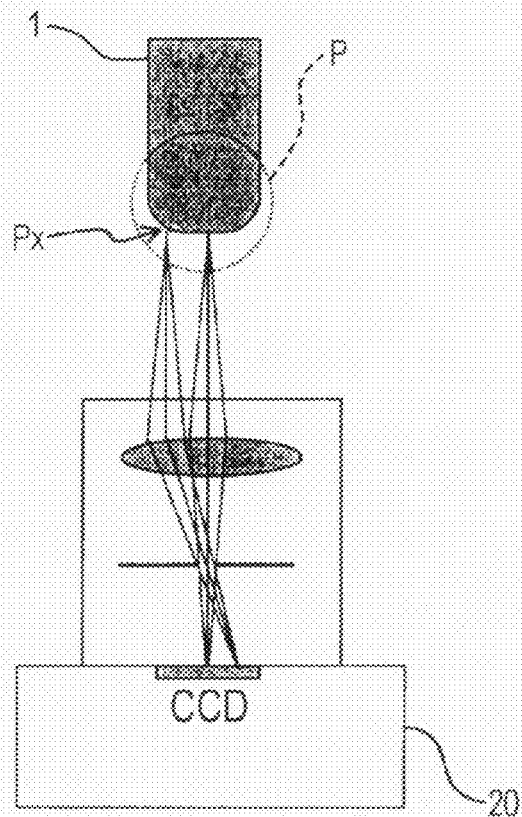
FIG. 3 is a diagram illustrating a property of a telecentric lens system camera which may be employed in the shape measuring apparatus Z.
Figure 4:
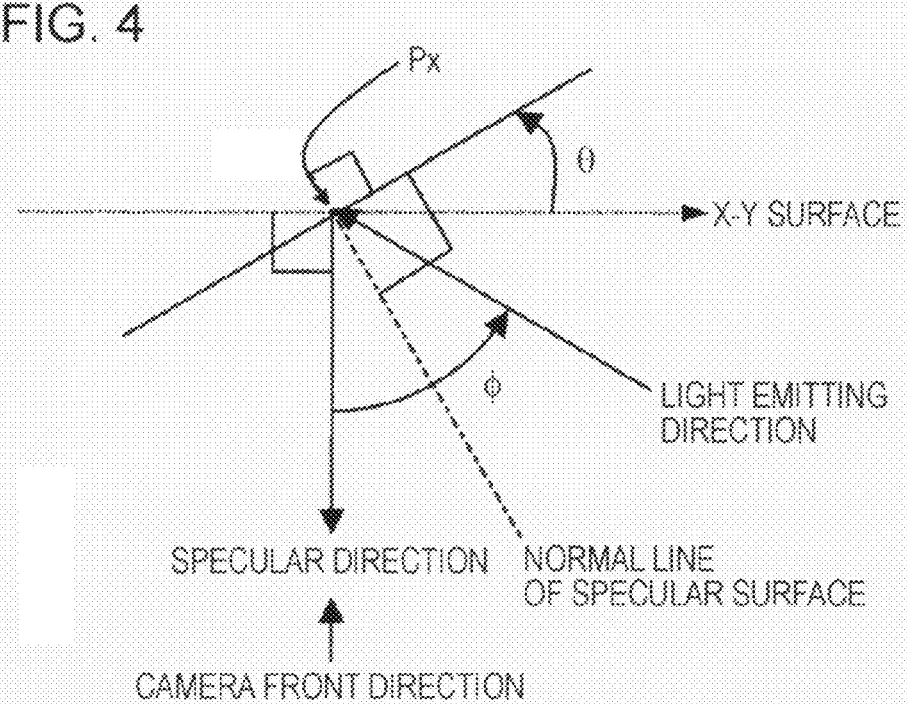
FIG. 4 is a diagram schematically showing a relationship between a surface angle and a light path at the measurement site when the telecentric lens system camera is employed for the shape measuring apparatus Z.
Figure 5:
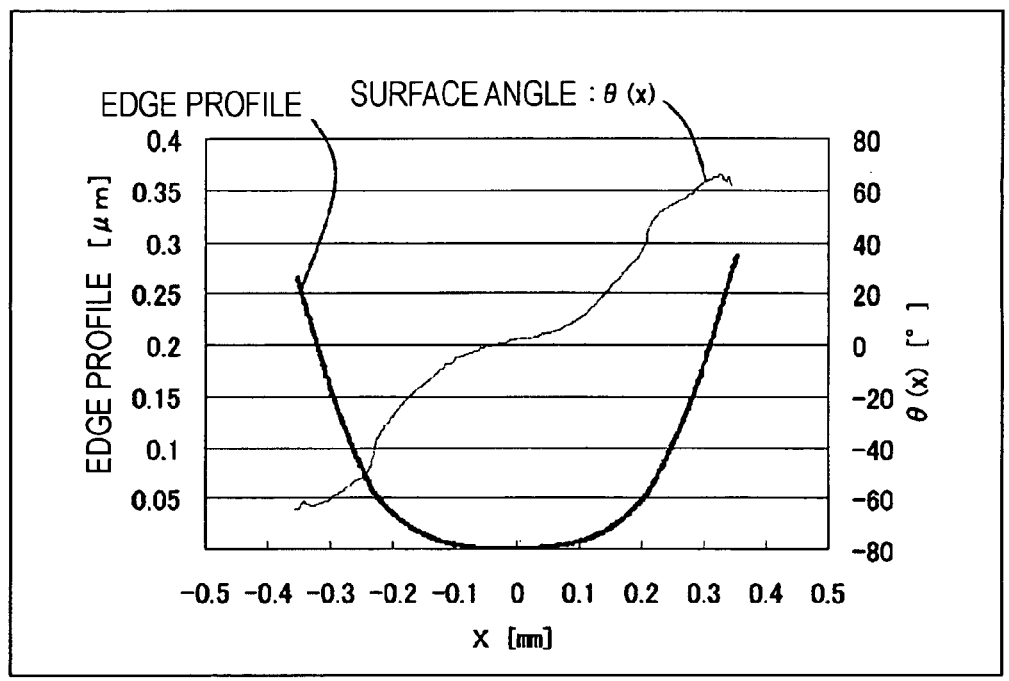
FIG. 5 is a graph illustrating a surface angle distribution and an edge profile of the measurement site calculated by the shape measuring apparatus Z.
Figure 6:
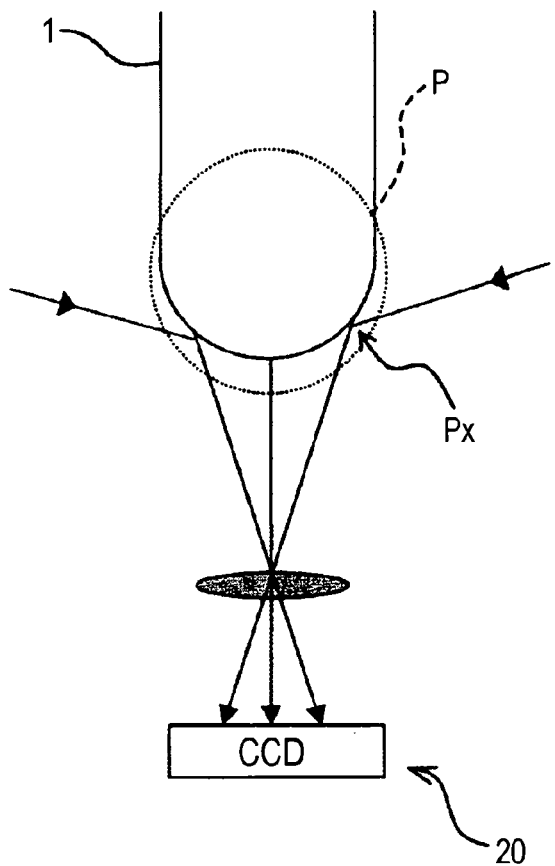
FIG. 6 is a diagram illustrating a property of a non-telecentric lens system camera which may be employed in the shape measuring apparatus Z.
Figure 7:
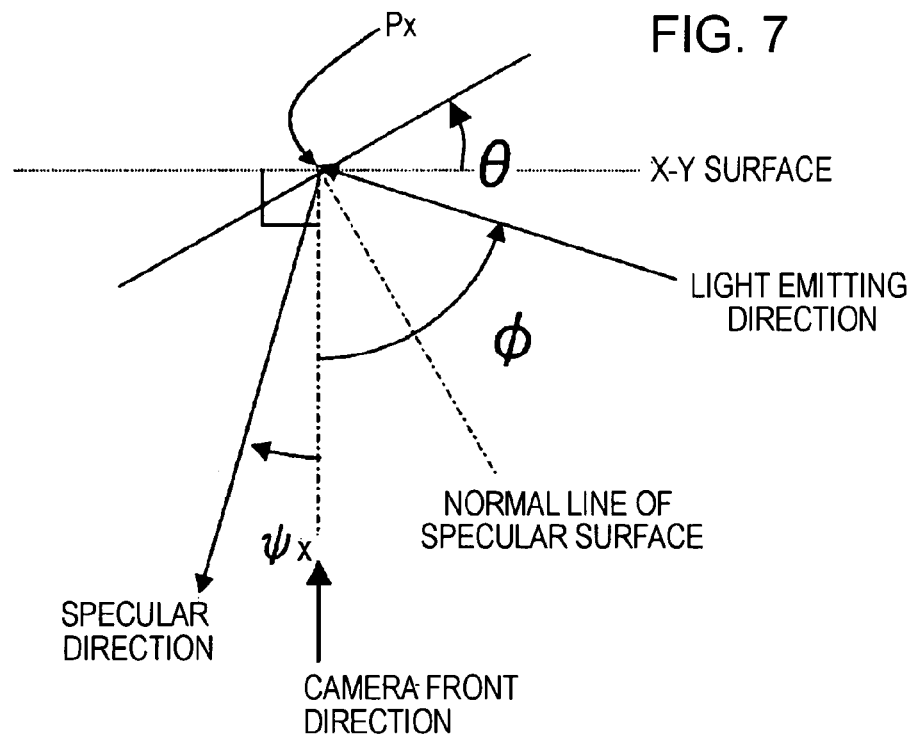
FIG. 7 is a diagram schematically showing a relationship between a surface angle and a light path at the measurement site when a non-telecentric lens system camera is employed for the shape measuring apparatus Z.
Figure 8A:
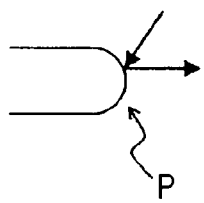
FIG. 8A is a diagram schematically illustrating a first example of a shape at the measurement site.
Figure 8B:
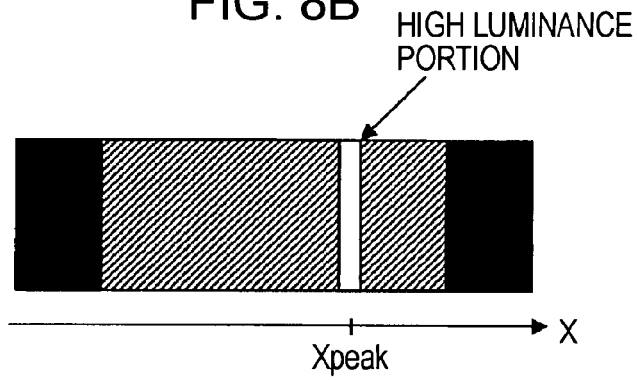
FIG. 8B is a diagram schematically illustrating a first example of an image photographed by a camera of the shape measuring apparatus Z.
Figure 9A:
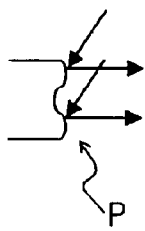
FIG. 9A is a diagram schematically illustrating a second example of a shape at the measurement site.
Figure 9B:
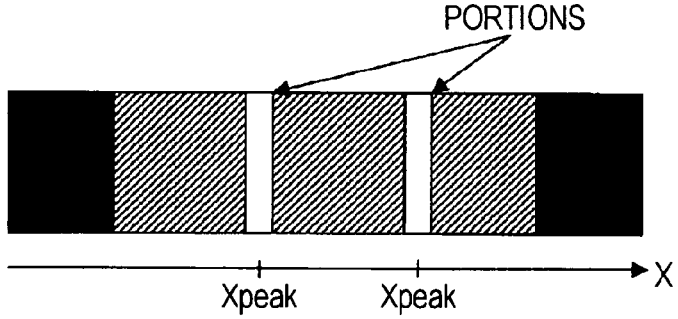
FIG. 9B is a diagram schematically illustrating a second example of an image photographed by the camera of the shape measuring apparatus Z.
Figure 10:
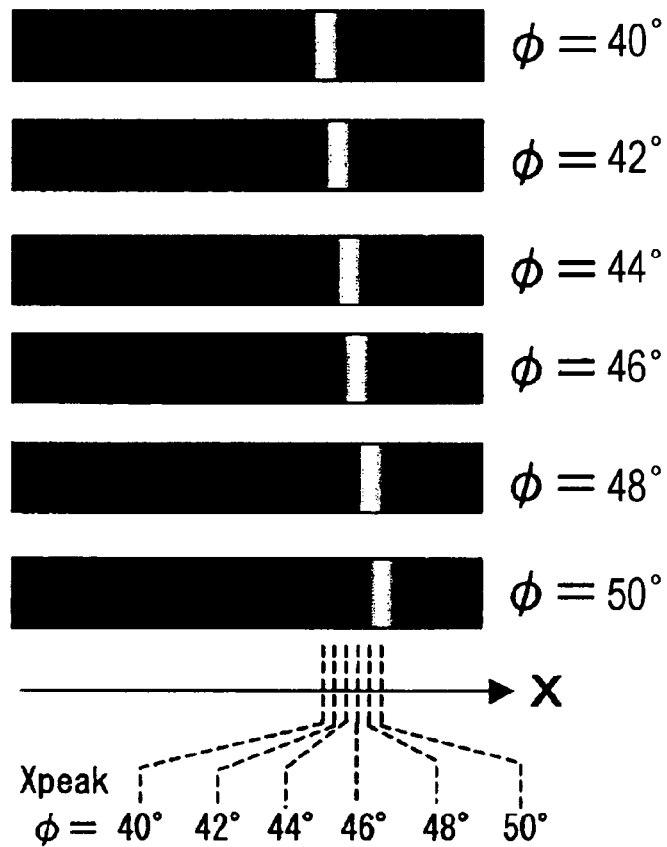
FIG. 10 is a diagram illustrating an example of an image photographed by the shape measuring apparatus Z.
Figure 11:
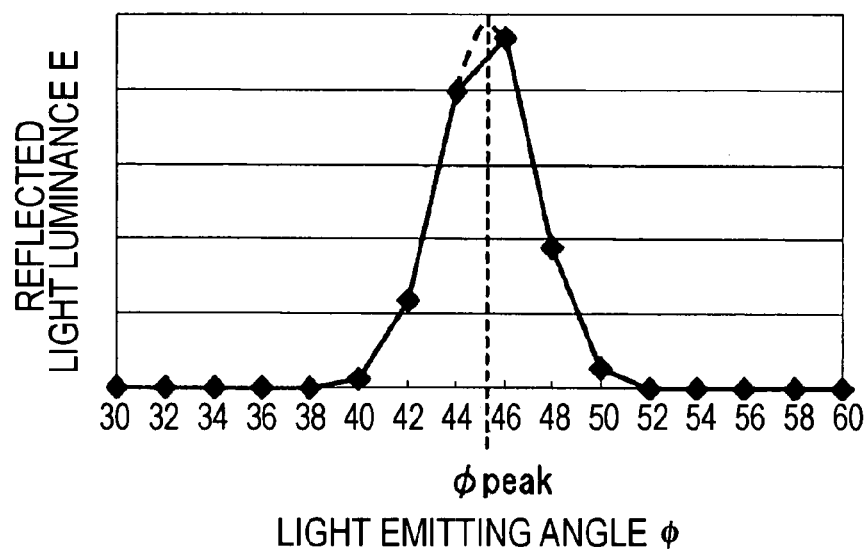
FIG. 11 is a graph illustrating an example of a relationship between light emitting angle and reflected light luminance at a predetermined calculating object position.
Figure 12:
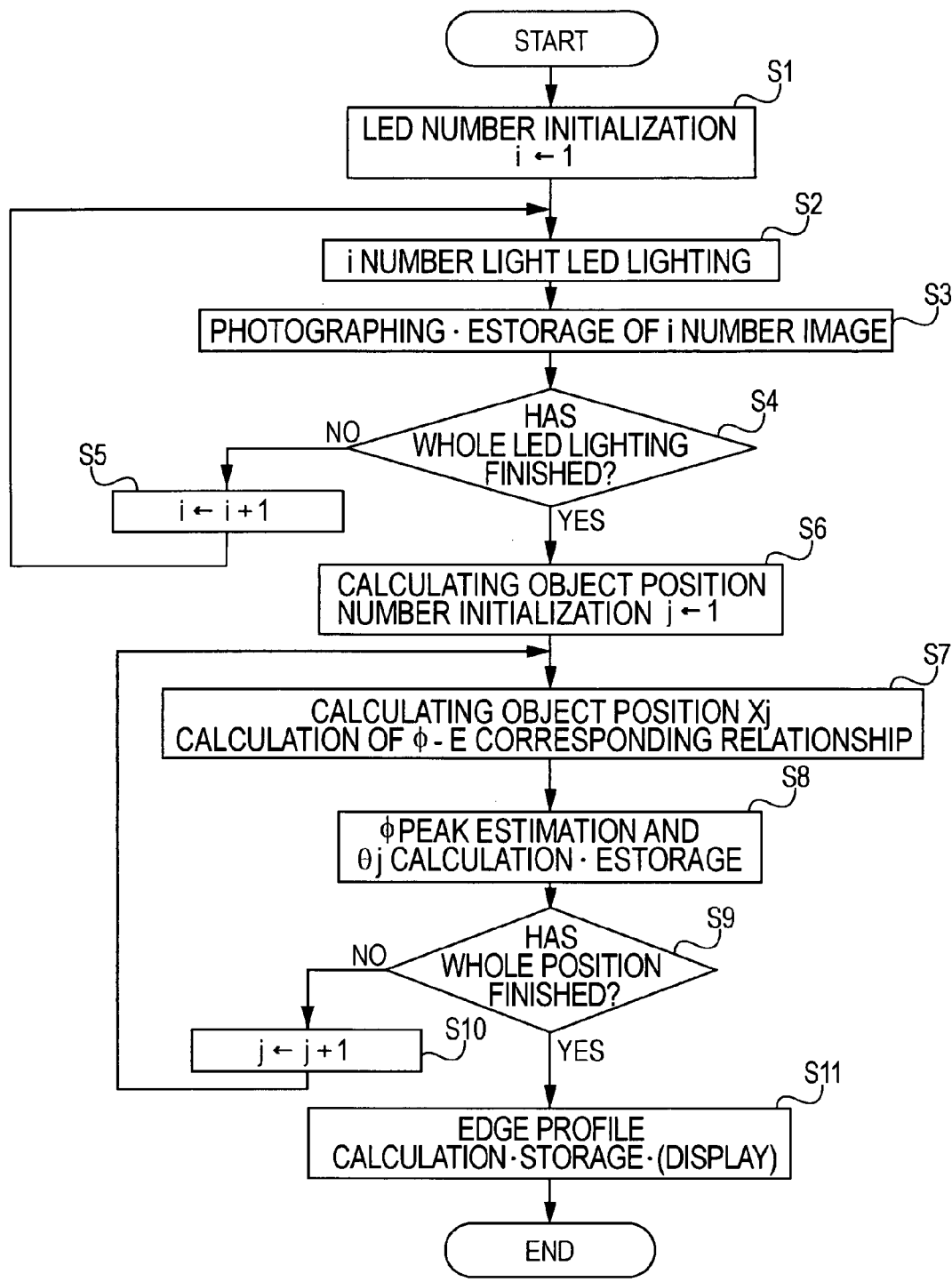
FIG. 12 is a flow chart illustrating measuring procedures performed by the shape measuring apparatus Z.
Figure 13:
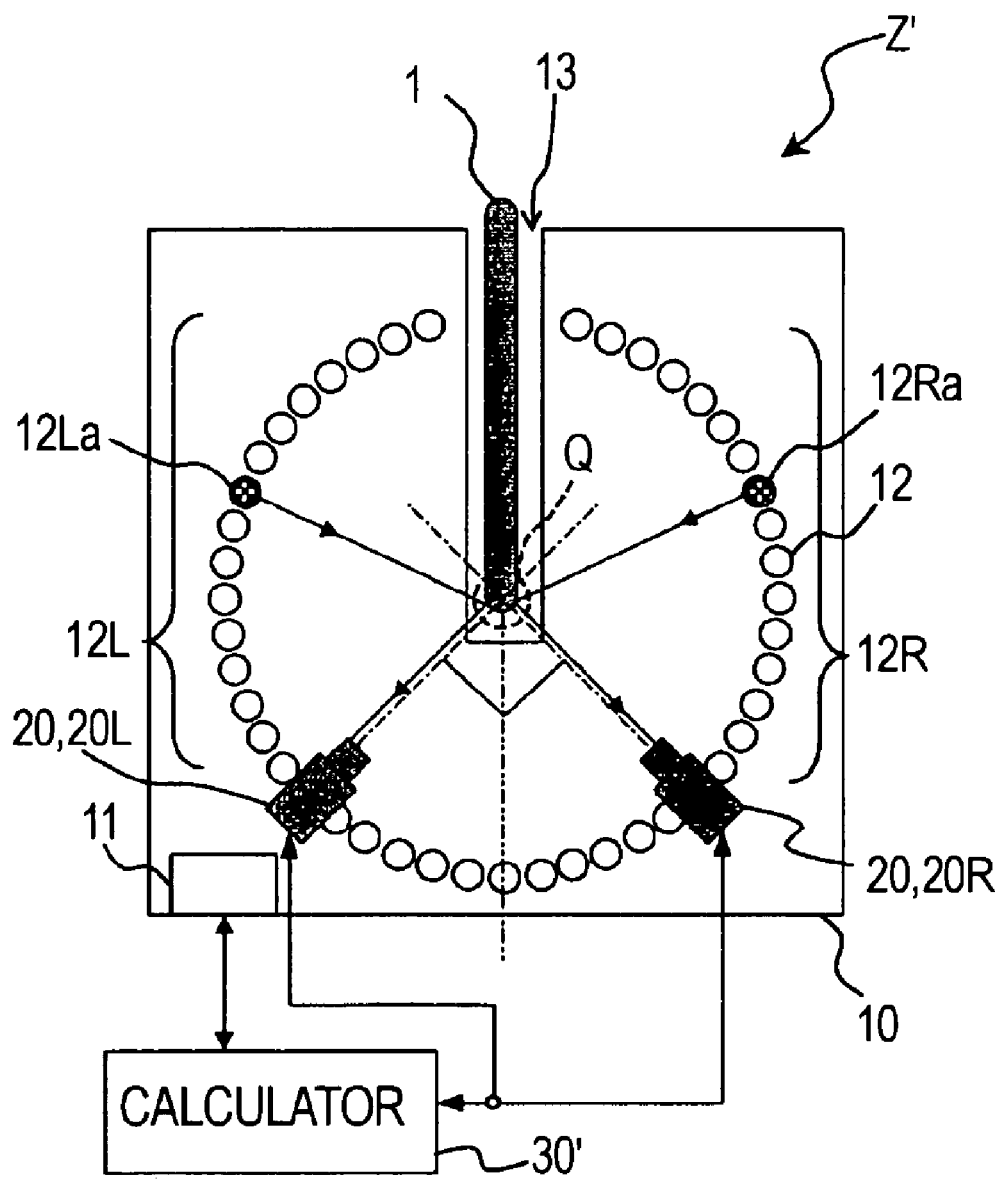
FIG. 13 is a configuration diagram schematically showing a shape measuring apparatus Z' which is a first application example of the shape measuring apparatus Z.
Figure 14A:
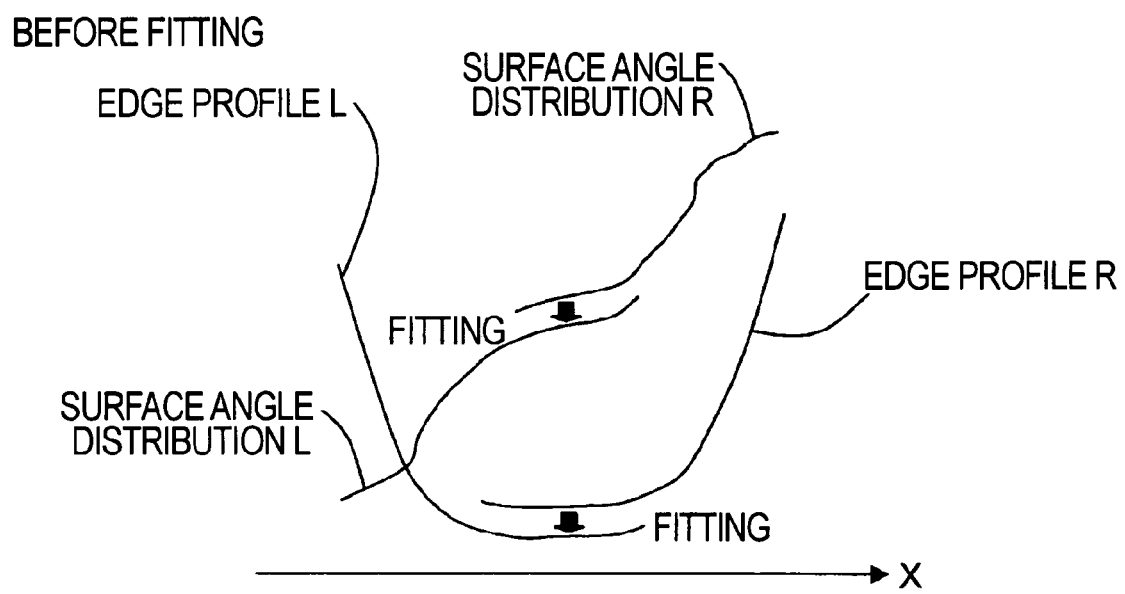
FIG. 14A is a diagram illustrating states before fitting processing of surface angles and edge profiles corresponding to each of two cameras obtained by the shape measuring apparatus Z'.
Figure 14B:
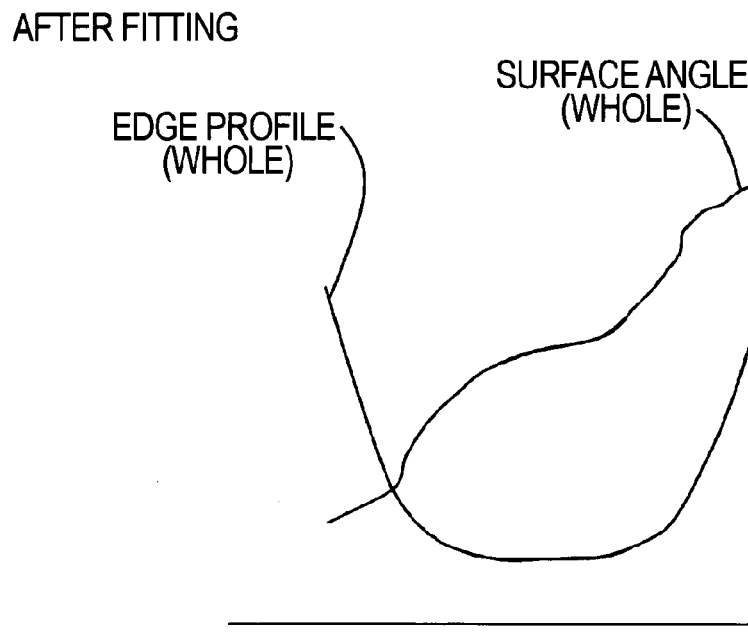
FIG. 14B is a diagram illustrating states after fitting processing of surface angle and edge profile corresponding to each of two cameras obtained by the shape measuring apparatus Z'.
Figure 16A:
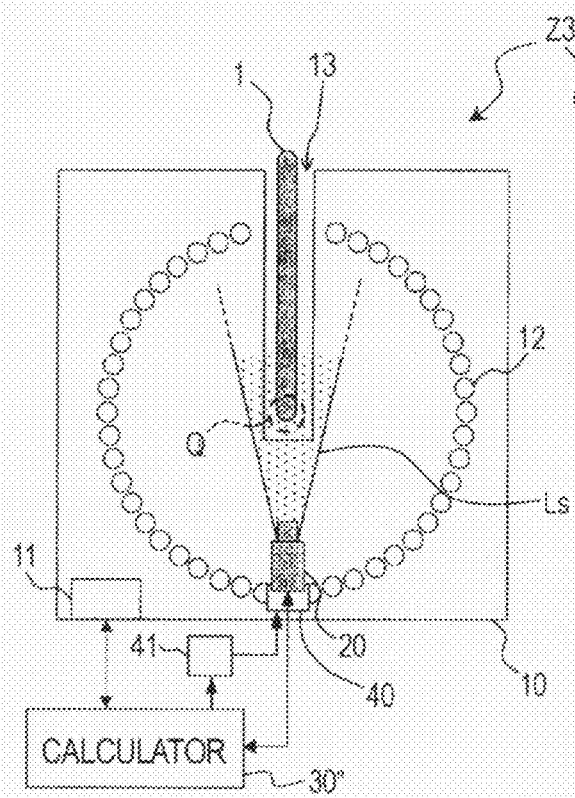
FIGS. 16A and 16B are each a configuration diagram schematically showing a shape measuring apparatus Z3 which is a third application example of shape measuring apparatus Z.
Figure 16B:
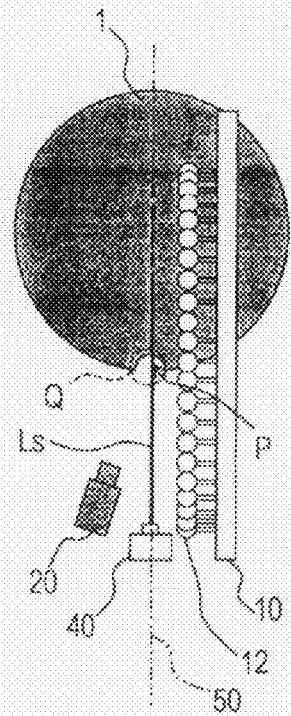
Figure 17A:
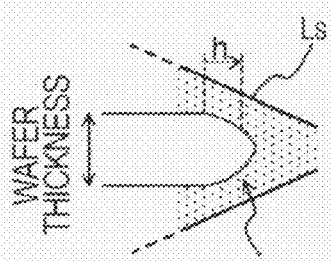
FIG. 17A is a diagram schematically showing an example of a measurement site P(a) to which sheet light is being emitted.
Figure 17B:
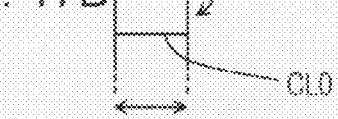
FIG. 17B is a diagram schematically showing an example of a measurement site P(b) to which sheet light is being emitted.
Figure 17C:
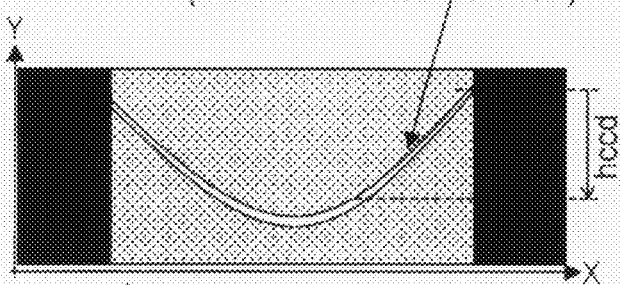
FIG. 17C is a diagram schematically showing an example of an image (c) of the measurement site P photographed by the camera.
Figure 18:
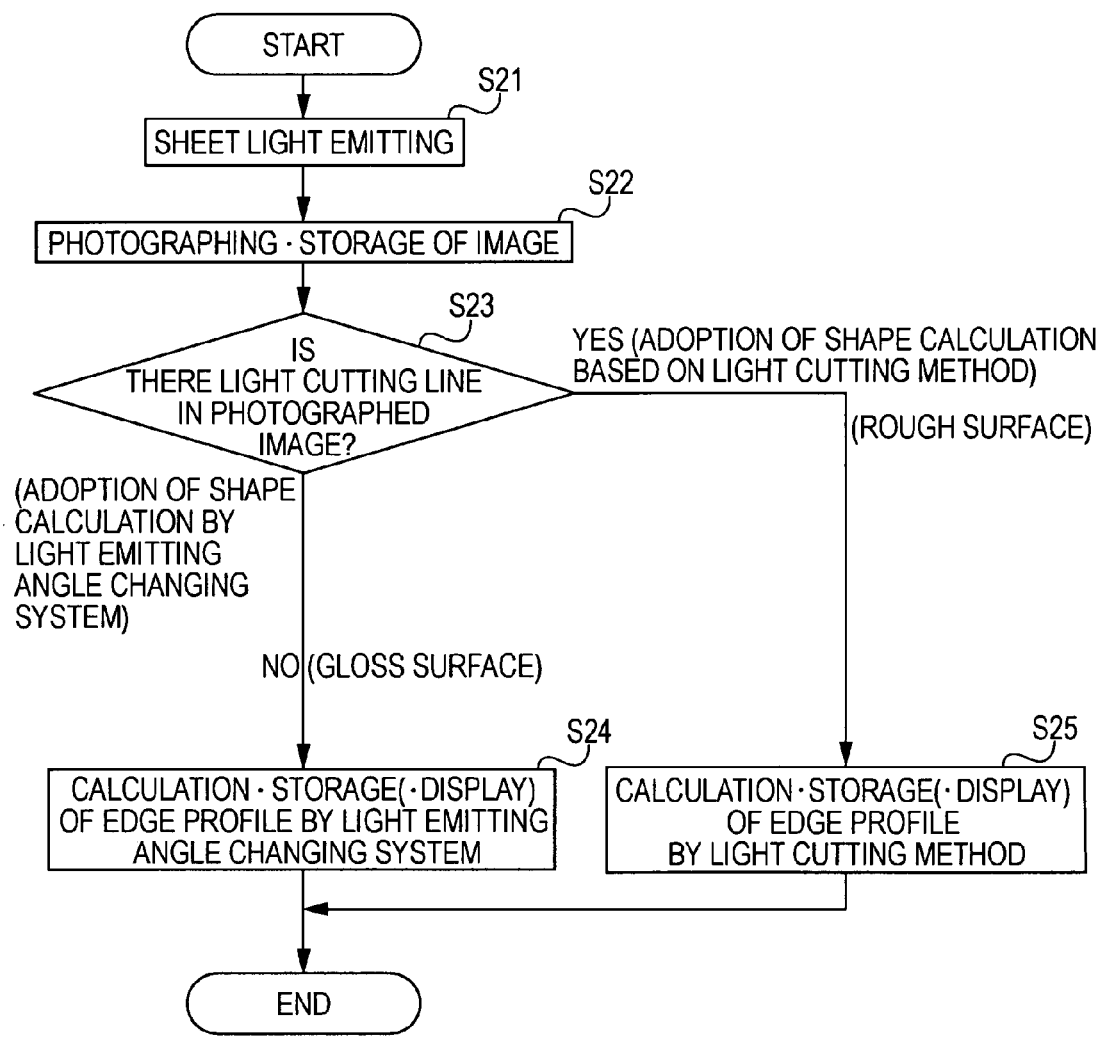
FIG. 18 is a flow chart illustrating measuring control procedures performed by the shape measuring apparatus Z3.

Here, FIGS. 1A and 1B are each a configuration diagram schematically showing a shape measuring apparatus Z according to an embodiment of the present invention, FIG. 2A is a diagram illustrating a definition of light emitting angle, FIG. 2B is a diagram illustrating a definition of surface angle, FIG. 3 is a diagram illustrating a property of a telecentric lens system camera which may be employed in the shape measuring apparatus Z, FIG. 4 is a diagram schematically showing a relationship between a surface angle and a light path at the measurement site when the telecentric lens system camera is employed for the shape measuring apparatus Z, FIG. 5 is a graph illustrating a surface angle distribution and an edge profile of the measurement site calculated by the shape measuring apparatus Z, FIG. 6 is a diagram illustrating a property of a non-telecentric lens system camera which may be employed in the shape measuring apparatus Z, FIG. 7 is a diagram schematically showing a relationship between a surface angle and a light path at the measurement site when a non-telecentric lens system camera is employed for the shape measuring apparatus Z, FIG. 8A is a diagram schematically illustrating a first example of a shape at the measurement site, FIG. 8B is a diagram schematically illustrating a first example of an image photographed by a camera of the shape measuring apparatus Z, FIG. 9A is a diagram schematically illustrating a second example of a shape at the measurement site, FIG. 9B is a diagram schematically illustrating a second example of an image photographed by the camera of the shape measuring apparatus Z, FIG. 10 is a diagram illustrating an example of an image photographed by the shape measuring apparatus Z, FIG. 11 is a graph illustrating an example of a relationship between light emitting angle and reflected light luminance at a predetermined calculating object position, FIG. 12 is a flow chart illustrating measuring procedures performed by the shape measuring apparatus Z, FIG. 13 is a configuration diagram schematically showing a shape measuring apparatus Z' which is a first application example of the shape measuring apparatus Z, FIG. 14A is a diagram illustrating states before fitting processing of surface angles and edge profiles corresponding to each of two cameras obtained by the shape measuring apparatus Z', FIG. 14B is a diagram illustrating states after fitting processing of surface angle and edge profile corresponding to each of two cameras obtained by the shape measuring apparatus Z', FIGS. 15A and 15B are each a configuration diagram schematically showing a shape measuring apparatus Z2 which is a second application example of the shape measuring apparatus Z, FIGS. 16A and 16B are each a configuration diagram schematically showing a shape measuring apparatus Z3 which is a third application example of shape measuring apparatus Z, FIG. 17A is a diagram schematically showing an example of a measurement site P(a) to which sheet light is being emitted, FIG. 17B is a diagram schematically showing an example of a measurement site P(b) to which sheet light is being emitted, FIG. 17C is a diagram schematically showing an example of an image (c) of the measurement site P photographed by the camera, and FIG. 18 is a flow chart illustrating measuring control procedures performed by the shape measuring apparatus Z3.

To begin with, a configuration of a shape measuring apparatus according to the embodiment of the present invention will be described with reference to FIGS. 1A and 1B. The shape measuring apparatus Z is a device which measures a shape of an edge (edge profile) of a semiconductor wafer 1 (hereinafter, referred to as wafer) which is an example of a thin sample. The wafer 1 shown in the embodiment is an approximately circular plate. However, a thin sample having other shape such as a rectangular plate or the like can also be a measuring object. Note that FIG. 1A is a plan view (a part of which is a block diagram) of the shape measuring apparatus Z, FIG. 1B is a side view (partly omitted) of the shape measuring apparatus Z.

Hereinafter, the edge surface of the wafer 1 which becomes a measuring object of edge profile is referred to as a measurement site P.

As shown in FIG. 1, the shape measuring apparatus Z includes a light emitting device 10, a camera 20 and a calculator 30 such as a personal computer or the like.

The light emitting device 10 is constructed as an electronic circuit card. A plurality of LEDs 12 which are light sources which emit light to the wafer 1 and an LED driving circuit 11 which switches blinking of each of the LEDs 12 are mounted on the electronic circuit card. It should be noted here that some of the LEDs are omitted in FIG. 1B.

Here, a predetermined position at the approximately center position of the light emitting device 10 (electronic circuit card) in plan view is referred to as a reference position Q.

A cutout portion 13 at which the wafer 1 is inserted is formed in the electric circuit card which constitute the light emitting device 10 so that the measurement site P of the wafer 1 can be disposed at the reference position Q. That is, the reference position Q is to be the disposed position of the measurement site P. An example in which a notch portion (semicircular cutout portion) of the wafer 1 is disposed at the reference position Q as the measurement site P is shown in FIG. 1B. However, the shape of the measurement site P of the wafer 1 is not limited to this. Further, a measurement site P can be easily changed by rotating the wafer 1. By doing so, an edge profile of the whole circumference of the wafer 1 or a plurality of places of the whole circumference can be easily measured.

Further, all of the LEDs 12 are mounted on the electronic circuit card so that the emitting portions thereof are positioned in one flat surface including the reference position Q and on a circular arc (along a circular arc) whose center is the reference position Q. Here, except for the position interfered by the camera 20, each LED 12 is disposed at even intervals (even angle intervals) so that, for example, the directions thereof viewed from the reference position Q are respectively different by about 2°.

Further, the distance between each LED 12 and the reference position Q (measurement site P) shall be sufficiently long distance (for example, about 150 mm) with respect to a depth size of the measurement site P.

Further, the surface (front surface and back surface) of the wafer 1 is perpendicular to the one plane in which the light emitting portions of the LEDs 12 are disposed, the center portion of the surface (center of the circular plate) is inserted to the cutout portion 13 in the state where the center portion of the surface is positioned in one plane in which the light emitting portions of the LEDs 12 are disposed, and measurement is performed at the sate.

The LED driving circuit 11 sequentially switches the plurality of LEDs 12 disposed at each of a plurality of positions in such a one plane to blink the LEDs 12 in accordance with a control order from the calculator 30. Thereby, the light emitting device 10 emits light at sequentially different angles with respect to the measurement site P of the wafer 1 disposed at the reference position Q (examples of first light emitting means, switch type light emitting means).

The edge surface (side surface) which is the measurement site P of the wafer 1 is smoothly processed to be a mirror surface or a surface of gloss such like a mirror surface. Accordingly, the light output from the LED 12 is basically regularly reflected and hardly diffusely reflected at the measurement site P.

The camera 20 is fixed at a position separated by a predetermined distance from the reference position Q (for example, about 50 mm to 100 mm), and detects a two-dimensional luminance distribution of the light emitted from each LED 12 to the measurement site P and reflected in the specular direction by photoelectrically converting by receiving the reflected light from the measurement site P of the wafer 1 (an example of first light detecting means).

In the example in FIG. 1, the camera 20 is disposed in one plane (the plane including the reference position Q) in which light emitting portions of the LEDs 12 are disposed and is disposed so that the face direction thereof look toward the center of the surface of the wafer 1. That is, the camera 20 is disposed so that the front direction thereof is to be a direction along the plane cross section of the center of thickness direction of the wafer 1 (so that the wafer 1 is viewed edge-on).

Moreover, the focal point of the camera 20 is set to the reference position Q (that is, the measurement site P).

The calculator 30 controls the LED driving circuit 11 in the light emitting device 10 (blink control of the LED 12) and performs shutter control of the camera 20 and download of a photographed image by the camera 20. An exemplary operation thereof will be described later. Here, as is not shown in FIG. 1, the calculator 30 is equipped with an interface for performing transfer of signal and acquisition of image data.

Note that, the processing in the calculator 30 shown below is realized by an MPU provided in the calculator 30 by performing a program stored in advance in storage means such as a hard disc or the like provided in the calculator 30.

Next, a principle of an edge profile measurement according to the shape measuring apparatus Z will be described.

When light is emitted to the measurement site P, the light is regularly reflected at the measurement site P having a glaze. Here, an image photographed by the camera 20 is an image showing a luminance distribution of the reflected light.

FIG. 8A is a diagram schematically showing an example (a) of a shape of the measurement site P and FIG. 8B is a diagram schematically showing an example (b) of the image of the measurement site P photographed by the camera 20.

In FIG. 8A, a shape of the measurement site P in which the surface angle thereof is simply increased (or simply decreased) is shown. Note that the up and down directions in FIG. 8A is the thickness direction of the wafer 1.

When such a measurement site P is photographed by the camera 20 while emitting light by only certain one LED 12, an image as shown in FIG. 8B can be obtained. Position $X_{peak}$ at which a peak appears in the image (position in the X coordinate direction, hereinafter, referred to as peak luminance position) corresponds to the position at which light beam emitted from the LED 12 is regularly reflected (specular position).

In addition, on the surface of the specular position of the measurement site P, when the normal direction thereof is standard, an incident angle and an output angle (angle in the reflected direction) of light is even (symmetric). For this reason, based on the peak luminance position $X_{peak}$ in an image photographed by the camera 20 and a emitting direction of light with respect to the measurement site P (direction from lighted LED 12 toward the measurement site P), the position at which light is regularly reflected at the measurement site P (specular position) and the surface angle of the specular position can be calculated to only one.

Here, before illustrating a measurement principle with the shape measuring apparatus Z, symbols which denote emitting direction and the like will be described with reference to FIGS. 2A and 2B. Note that FIG. 2A is a diagram schematically showing a state of the shape measuring apparatus Z in plan view and FIG. 2B is an enlarged diagram of a portion of the measurement site P.

As shown in FIGS. 2A and 2B, when the direction of the straight line defined by the measurement site P and the camera 20 (hereinafter, referred to as camera front direction) is standard, emitting angle of light shall be $\phi$. In addition, when the surface perpendicular to the camera front direction (hereinafter, referred to as X-Y surface as the meaning which corresponds to X-Y surface in photographed image) is standard, a surface angle at specular position Px of light in the measurement site P shall be $\theta$.

Next, a principle of the edge profiling measurement by the shape measuring apparatus Z will be described with reference to FIG. 4. Here, the description will be made for the camera 20 of a telecentric lens system type.

Images are imaged on a CCD in such an aspect as shown in FIG. 3 in a telecentric lens system camera.

In the case where a camera 20 which detects a luminance distribution of reflected light is a telecentric lens system camera, as shown in FIG. 4, the direction of reflected light which reaches the CCD (light receiving unit) of the camera 20 and the front direction of the camera 20 becomes approximately parallel, and a peak luminance position $X_{peak}$ at which a peak of high luminance in a photographed image exists directly shows a specular position Px of light in the measurement site P. Further, an illumination direction and a reflection direction of light are symmetric with respect to the normal line of the surface of the specular position Px, so that $(90-\theta-\phi/2)=(90-\phi)$ is given. Consequently, the equation (1) as shown below is given.

$$\theta=\phi/2 \qquad (1)$$

Accordingly, by specifying a peak luminance position $X_{peak}$ in a photographed image by image processing, a specular position Px can be specified. Further, surface angle $\theta$ at a specular position Px can be specified from a light emitting angle $\phi$ (known angle) defined in accordance with the position of the lighted LED 12 (known position).

Next, an edge profiling measurement with the shape measuring apparatus Z which employs a camera 20 which is not the telecentric lens system (hereinafter, referred to as non-telecentric lens system) will be described with reference to FIG. 7.

Images are imaged on a CCD in such an aspect as shown in FIG. 6 in a non-telecentric lens system camera.

When a non-telecentric lens system camera 20 is employed, as shown in FIG. 7, if the angle (direction) of reflected light reflected at the specular position Px in the measurement site P and reached to be imaged on the CCD of the camera 20 is indicated by $\phi x$ when the front direction of the camera is standard, $2\theta+\phi x=\phi$ is given, so that next equation (2) is given. In this regard, $\phi x$ is preliminarily obtained for each position in the coordinate system of the camera 20 (position in the X coordinate direction).

$$\theta=(\phi-\phi x)/2 \qquad (2)$$

Accordingly, by specifying a peak luminance position $X_{peak}$ in a photographed image by image processing, a specular position Px in the measurement site P can be specified based on the peak luminance position $X_{peak}$, the angle $\phi x$, and a distance between the camera 20 and the measurement site P. Further, a surface angle $\theta$ at the specular position Px can be specified by a light emitting angle $\phi$ (known angle) defined in accordance with the position (known position) of the lighted LED 12 based on the equation (2).

In addition, if an image data of the measurement site P is obtained through the camera 20 each time lighted LED 12 is sequentially switched (that is, each time light emitting angle $\phi$ is switched) and the light emitting angle $\phi$ and the surface angle $\theta$ at that time are obtained, the surface angle $\theta$ for each of the plurality of the specular position, that is, a distribution of the surface angle $\theta$ at the measurement site P can be obtained.

FIG. 10 shows an example of an image (image of the camera 20) showing an image data obtained for every light emitting angle $\phi$ for the measurement site P having the same shape as the shape shown in FIG. 8A. The right direction toward FIG. 10 is the X axis direction of the coordinate system of the camera 20 (that is, the thickness direction of the wafer 1).

As shown in FIG. 10, a high luminance position $X_{peak}$ corresponding to a specular position Px in the measurement site P changes in accordance with the changing of the light emitting angle $\phi$. The high luminance position $X_{peak}$ corresponds to the specular position Px in the measurement site P.

Note that the distance between the specular position Px and the LED 12 is slightly different in accordance with the specular position Px, so that an error is included in the surface angle $\theta$ obtained by the above described method in accordance with the distance differences. However, the error can be reduced to a negligible level by sufficiently lengthening the distance between the LED 12 and the measurement site P with respect to a surface displacement of the measurement site P.

Further, in FIG. 10, a distribution of luminance existing at the portion of strip-shaped high luminance is caused by surface roughness of the measurement site P and the practice F number of the camera 20. In addition, when a telecentric lens system camera is employed, some of the reflected light except the reflected light parallel to the camera front direction arrives to the CCD of the camera 20 also causes the distribution of luminance.

On the other hand, FIG. 9A is a diagram schematically showing another example (a) of a shape of the measurement site P and FIG. 9B is a diagram schematically showing an example (b) of a photographed image of the measurement site P by the camera 20.

The measurement site P having the dimple shape is shown in FIG. 9A. Note that, the up and down direction in FIG. 9A is the thickness direction of the wafer 1.

If such a measurement site P is photographed by the camera 20 while emitting light by only one LED 12, as shown in FIG. 9B, an image having a plurality peak luminance positions $X_{peak}$ can be obtained. This phenomenon occurs when a plurality specular positions Px having the same surface angle $\phi$ exist in the measurement site P. The method of obtaining the surface angle is the same as in the case where the measurement site P has the shape as shown in FIG. 8A.

Using the shape measuring apparatus Z makes it possible to measure a distribution of the surface angle even when the measurement site P has such a dimple.

Next measuring procedures of the measurement site P of the wafer 1 with the shape measuring apparatus Z will be described with reference to the flowchart shown in FIG. 12. Hereinafter, S1, S2, . . . each denote an identification code of the processing procedures (step). Note that the processing shown in FIG. 12 is started in the state where the measurement site P of the wafer 1 is disposed so as to be positioned at the reference position Q.

Steps S1 to S5

First, the calculator 30 initializes a number i (i=1) which discriminate each LED 12 (S1).

Then, with the calculator 30, LED 12 of the number i is lighted by controlling the LED driving circuit 11 (S2), the measurement site P is photographed (shutter ON) by the camera 20 and the photographed image is stored in the lighted condition (S3), and these steps are repeated till lighting and photographing is finished for every LED 12 (S4) while sequentially counting up the number i (S5). The photographed image by the camera 20 is stored in storage means such as a hard disc or the like equipped in the calculator 30.

By the processes of steps S1 to S4, light is emitted at sequentially different emitting angle $\phi$ with respect to the measurement site P by the light emitting device 10 (S2). Further, image data (photographed image) showing a luminance distribution of the reflected light from the measurement site P is obtained through the camera 20 (an example of first light detecting means) with the calculator 30 (an example of reflected light luminance obtaining means) each time light is emitted at a different angles.

Steps S6 to S11

Next, with the calculator 30, a distribution of the surface angle and an edge profile of the measurement site P are calculated based on the image data (luminance distribution of reflected light) corresponding to each LED 12 obtained by the process in step S3 and the emitting angle $\phi$ of the light emitted to the measurement site P by the LED 12 (S11, an example of surface angle distribution calculating means)

By the way, if a changing range of the emitting angle $\phi$ of light with the light emitting device 10 is considerably reduced, distribution of the surface angle of the measurement site P can be calculated at a high spatial resolution by obtaining the position at which the luminance of the reflected light is most high each time the emitting angle of the light is changed.

However, there is a limit to reduce the changing range of the emitting angle $\phi$ of the light. In addition, photographing number (number of sampling the luminance distribution of the reflected light) by the camera 20 is increased and as the changing range of the emitting angle $\phi$ of the light is reduced, which requires a long measurement time. Further, a number of the image data which should be obtained with the calculator 30 is increased to cause increasing of the required memory capacitance of the calculator 30.

Consequently, the calculator 30 in the embodiment obtains distribution of the surface angle and edge profile of the measurement site P by the processes described below.

First, the calculator 30 initializes a number j (j=1) which discriminate each of a plurality of positions in the X coordinate direction preliminarily defined in a photographing range of the camera 20 (an example of a light detecting range of light detecting means) (S6).

Then the calculator 30 calculates a corresponding relationship between the emitting angle $\phi$ of the light and the luminance E of the reflected light (hereinafter, referred to as $\phi$-E corresponding relationship) for each calculating object position Xj (S7).

FIG. 11 is an example of a graph showing the corresponding relationship between the emitting angle $\phi$ of the light (lateral axis) and the luminance E of the reflected light (vertical axis) in some calculating object position Xj.

Moreover, the calculator 30 estimates the emitting angle $\phi$peak of the light at which the luminance E of the reflected light becomes the peak (hereinafter, referred to as estimation peak time emitting angle) by performing a predetermined calculation based on the $\phi$-E corresponding relationship obtained in step S7, and calculates the surface angle $\theta$j at the calculating object position Xj to store it (S8).

As show in FIG. 11, the $\phi$-E corresponding relationship is based on discrete data. Here, an estimation peak time emitting angle $\phi$peak can be estimated by an interpolation calculation process based on the $\phi$-E corresponding relationship as shown in FIG. 11 except in the case where each of the LEDs 12 in the light emitting device 10 are disposed at extremely wide distance. As specific examples of the interpolation calculation process, an interpolation calculation process based on barycentric method, an interpolation calculation process based on fitting processing using a two-dimensional function or a gauss distribution function, or the like are considered. Note that the light emitting angle $\phi$ which shows only the max luminance may be the estimation peak time emitting angle $\phi$ peak. In this regard, in this case, it is required to pay attention to the point that the error increase depending on the distance between each LED 12.

In addition, the calculating method of the surface angle $\theta$j based on the estimation peak time emitting angle $\phi$peak is the same as the calculating method of the surface angle $\theta$ of the specular position Px based on the light emitting angle $\phi$ described above.

Then, the calculator 30 repeats the process of steps S7 to S8 for preliminarily defined whole calculation object positions Xj (S9) while sequentially counting up the number j (S10). The surface angle $\theta$j of each calculation object position Xj calculated in step S8 is stored in storage means such as a hard disc or the like equipped in the calculator 30.

By the processes in step S1 to S10 as described above, a distribution of the surface angle $\theta$ of the measurement site P can be obtained (information showing a corresponding relationship between the calculating object position Xj and the surface angle $\theta$j).

Thus, the calculator 30 calculates the surface angle $\theta$j of each calculation object position Xj by performing calculation which estimate the estimation peak time emitting angle $\phi$peak (emitting angle of the light when luminance of the reflected light becomes peak) based on the corresponding relationship between the light emitting angle φ and the luminance E of reflected light (S7 to S10, an example of surface angle distribution calculating means). As a result, a distribution of the surface angle θj can be measured at the same high spatial resolution as in the case where each LED 12 in the light emitting device 10 is very closely disposed. Theoretically, the spatial resolution of the surface angle distribution can be enhanced to the revel of the resolution (pixel resolution) of the camera 20.

Finally, the calculator 30 calculates the edge profile (surface shape) of the measurement site P based on the distribution of the surface angle θj obtained by the processes of steps S6 to S10 to store the edge profile (S11), and the measurement processing is finished. At this time, the edge profile of the measurement site P is displayed by the calculator 30 on a display unit thereof as needed.

Here, difference Δhj between a surface height of a calculation object position Xj in the measurement site P and a surface height of the calculation object position Xj+1 lying next thereto can be calculated by the next equation (3).

$$\Delta hj = d \cdot \tan \theta j \quad (3)$$

In this regard, d is a distance between adjacent calculation object positions Xj in the measurement site P (distance in X axis direction). Here, the distance between pixels in the X axis direction of the camera 20 is the distance converted to the real spatial.

A distribution of height of the measurement site P, that is, an edge profile can be calculated by sequentially applying the equation (3) from the base point of the calculation object position Xj.

FIG. 5 is a graph showing an example of a distribution of the surface angle φ(x) and an edge profile obtained by measuring the measurement site P of the wafer 1 with the shape measuring apparatus Z. The lateral axis indicates a position of the thickness direction of the wafer 1, the left vertical axis indicates a surface position of the measurement site (that is, edge profile), and the right vertical axis indicates a surface angle θ. Note that in FIG. 5, in the surface angle θ(x) indicated by the thin solid line graph, each of the calculation object positions Xj is substituted to the positions of the real spatial in the measurement site P. Further, the edge profile indicated by the thick solid line graph is calculated based on the equation (3).

In this manner, an edge profile of a thin sample such as the wafer 1 and the like can be measured at high accuracy by using the shape measuring apparatus Z.

Shape Measuring Apparatus Z' (First Application Example)

Next, a shape measuring apparatus Z' which is a first application example of the shape measuring apparatus Z will be described with reference to FIG. 13. Hereinafter, only different points as compared to the shape measuring apparatus Z will be described for the shape measuring apparatus Z'. Note that in FIG. 13, same reference numerals are used to designate the same elements shown in FIG. 1.

As shown in FIG. 13, the shape measuring apparatus Z' is equipped with two cameras 20R and 20L as for the camera 20 for detecting a luminance distribution of the reflected light from the measurement site P. Each of the cameras 20R and 20L are disposed at different directions with respect to the measurement site P. Hereinafter, the two cameras 20R and 20L are referred to as a first camera 20R and a second camera 20L.

Further, the shape measuring apparatus Z' is equipped with a calculator 30' instead of the calculator 30 described above.

The calculator 30' executes a program which is partly different from that of the calculator 30.

In the example shown in FIG. 13, two cameras 20R and 20L are disposed in the directions so as to make 90° with respect to the reference position Q (that is, measurement site P) which is the reference point (directions of ±45° with respect to the surface direction of the wafer 1). With this configuration, each of the both cameras 20R and 20L detects a luminance of the reflected light reflected at a part region (an observable region from each of the disposed positions) among whole region (whole surface) of the measurement site P.

Then, the calculator 30' controls two cameras 20R and 20L to perform photographing and storage of image data each time the light angle φ is altered in step S3 (see FIG. 12) described above.

Further, the calculator 30' calculates a distribution of the surface angle θj of a part region of the measurement site P based on the image data and the emitting angle of the light (estimation peak time emitting angle φ peak) for each image data (data showing a luminance distribution of the reflected light) obtained through each two camera 20R and 20L in steps S7 and S8 (see FIG. 12) described above. In the example shown in FIG. 13, the calculator 30' calculates a distribution of the surface angle θj of the region near the right side surface (one of the surface) of the wafer 1 based on the imaged data obtained through the first camera 20R. In the same way, the calculator 30' calculates a distribution of the surface angle θj of the region near the left side surface (another of the surface) of the wafer 1 based on the imaged data obtained through the second camera 20L. Here, a part of both regions overlaps.

Further, the calculator 30' calculates an edge profile for the each part region based on each of the distributions of the surface angle θj of the part region corresponding to both cameras 20R and 20L (calculated result in the process in Step 8) and calculates an edge profile of the whole measurement site P by performing a combining process thereof (an example of combining calculation means).

Alternatively, the calculator 30' calculates a surface angle distribution θj of the whole measurement site P by performing combining process of each of distributions of surface angle θj of the part region corresponding to both cameras 20R and 20L in step S11 described above (calculated result of process in step S8) and calculates an edge profile of whole measurement site P based on the calculated result (an example of combining calculation means).

In this manner, two types of methods, the method to obtain an edge profile of each region and combine each thereof and the method to combine a distribution of the surface angle θj of each region and then obtain an edge profile of the whole region are considered.

Here, the combination may be performed by a known fitting processing which adjust (correct)-offset and the like thereof so as to minimize the difference of the edge profiles or the distributions of the surface angle θj corresponding to each camera 20R and 20L for the overlapping part of the part region corresponding to each of the both cameras 20R and 20L.

Thereby, for example, even when a viewing range (detecting range of light) of one camera is about ±60°, surface angle distribution measurement can be performed in the range of ±90° (180° in total) required in general edge profile measurement.

Further, the calculator 30' calculates an edge profile for the each part region based on each of the distributions of the surface angle θj of the part region corresponding to both cameras 20R and 20L (calculated result in the process in Step 8) and calculates an edge profile of the whole measurement site P by performing a combining process thereof (an example of combining calculation means).

Alternatively, the calculator 30' calculates a surface angle distribution θj of the whole measurement site P by performing combining process of each of distributions of surface angle θj of the part region corresponding to both cameras 20R and 20L in step S11 described above (calculated result of process in step S8) and calculates an edge profile of whole measurement site P based on the calculated result (an example of combining calculation means).

FIGS. 14A and 14B are each a diagram showing a state of a surface angle distribution and an edge profile corresponding to each of two cameras obtained by the shape measuring apparatus Z' before or after fitting processing. FIG. 14A shows a diagram before fitting processing and FIG. 14B shows a diagram after fitting processing.

In addition, "surface angle distribution R" and "edge profile R" denote a distribution of surface angle θj and an edge profile corresponding to the first camera 20R. In a similar way, "surface angle distribution L" and "edge profile L" denote a distribution of surface angle θj and an edge profile corresponding to the second camera 20L.

As shown in FIG. 14A, an offset (disagreement) may occur between a surface angle distribution R of the region corresponding to the first camera 20R and an edge profile R based thereon and a surface angle distribution L of the region corresponding to the second camera 20L and an edge profile L based thereon.

Combination of these results by performing the fitting process to the part of the overlapping region provides a surface angle distribution (whole) and an edge profile (whole) of the whole region of the measurement site P as shown in FIG. 14B.

In addition, as for a part of LEDs 12, the calculator 30' controls a plurality of LEDs 12 corresponding to each camera 20R and 20L so as to be lighted at the same time in the processes (step S1 to S5) in which a plurality of LEDs 12 are sequentially switched to be lighted through the LED driving circuit 11 (an example of switch type light emitting means).

As shown in FIG. 13, among the plurality of LEDs 12 disposed along a circular arc, as for a part (for example, LED 12Ra) of the LEDs 12R which opposes the first camera 20R and disposed at the far side of the second camera 20L, output light thereof will be blocked by the wafer 1 so that the output light will not reach the second camera 20L (no detection).

Similarly, as for a part (for example, LED 12La) of the LEDs 12L which opposes the second camera 20L and disposed at the far side of the first camera 20R, output light thereof will be blocked by the wafer 1 so that the output light will not reach the first camera 20R.

Consequently, the calculator 30' controls the LED driving circuit 11 so that a part of the LEDs 12 (LED 12Ra or the like) corresponding to the first camera 20R and a part of the LEDs 12 (LED 12La or the like) corresponding to the second camera 20L are lighted at the same time.

Thereby, the measuring time can be reduced.

The shape measuring apparatus Z' shown in FIG. 13 includes two cameras 20. However, it should be noted here that the same effect can be obtained even when the shape measuring apparatus includes not less than three cameras.

In the embodiment described above, LED 12 which is a diffusion light source is directly employed as a light source. The reason why such a configuration can be employed is that each LED 12 is disposed at sufficiently far distance as compared with the size (length of the depth) of the measurement site P and light from each LED 12 can be considered as parallel light at the measurement site P.

On the other hand, when a light source such as an LED or the like is disposed closely to the measurement site P, light from the light source is desired to be made to parallel light before emitting the measurement site P by using a lens.

Further, in the embodiment described above, the LED 12 is employed as a light source. However, other kind of light sources such as a lesser diode, electric light bulb, fluorescent lamp or the like may be employed.

Further, in the embodiment described above, a shape of an end surface of the wafer 1 is measured across the whole thickness direction of the wafer 1, so that the camera 20 is set so as to view the wafer 1 just from the side. However, the camera 20 may be set at a different position and in a different direction as in the case of the embodiment described above in accordance with an object.

Further, in the general edge profile measurement, it is sufficient to measure a surface angle distribution of one-dimensional direction (thickness direction of the wafer 1) for each measurement site P. Accordingly, as for means for detecting a luminance of the reflected light from the measurement site P, a one-dimensional optical receiver constructed by disposing a plurality of photoelectric conversion elements in one row (one-dimensional direction) may be used.

Note that as for a thin sample such as an aluminum substrate, a glass substrate or the like, edge profile can also be measured.

Further, in the embodiment described above, the configuration is shown in which the reflected light form the measurement site P is directly injected into the camera 20. However, an optical equipment (such as a mirror or the like) which changes direction of the reflected light from the measurement site P may be provided to inject the reflected light whose direction is changed by the optical equipment into the camera 20. Thereby, in the case where reflected light proceeding along the direction of the plane in which the light source (LED 12) is disposed is to be detected, intervention between the camera 20 which needs a relatively large formed space and the light source can be avoided. Thereby a range of light emitting angle can be enlarged and measuring range of the surface angle of the measurement site P can be further spread.

Further, the light emitting device 10 in the embodiment described above is a switch type light emitting device in which a plurality of light sources (LEDs 12) are sequentially switched and lighted. However as for the light emitting device, the light emitting device may be a move type light emitting device in which light moving mechanism with which one or relatively small number of light source (LED or the like) is sequentially moved to each of a plurality of the positions (for example, positions at which each LEDs 12 is disposed in the light emitting device 10) in one plane is equipped and the light source is lighted at each moved point. In such a move type light emitting device, as in the case of the light emitting device 10, a device which emits light at sequentially different emitting angle φ with respect to the measurement site P may also be constructed.

As for the move type light emitting device, for example, the device equipped with a rail of a circular arc whose center is the reference position Q, a moving mechanism for moving a light source such as an LED or the like along the rail, a position sensor for detecting the arrival of the LED to each of a plurality of predetermined positions moved by the moving mechanism, and a controlling device for controlling the moving mechanism so as to sequentially move the light source to each position where the light source is detected by the position sensor is considered.

By the way, when the light emitting device 10 which switches a plurality of light sources (LED 12 in the embodiment described above) to emit light to the measurement site P is used, according to the difference between each of light sources, variation of luminous (light intensity) of the light emitted to the measurement site P of the reference position Q from each light source may occur. Accordingly, it is important to preliminarily adjust the light sources so that the variation is to be reduced as much as possible.

To be more specific, a light sensor may be disposed to the reference position Q at which the measurement site P is disposed and an electric power (voltage or current), that is, light emitting amount (light emitting intensity) of each light source supplied to each light source is preliminarily adjusted so that light intensity detected by the light sensor becomes a predetermined level when each light source is sequentially switched and lighted.

For example, when the light source is an LED, a variable resistance is provided to an electric power supplying line to each LED and a supply current to each LED is preliminarily adjusted by adjusting the resistance value of the variable resistor. Alternatively, a pulse duration modulation device which makes it possible to control electric power supplying to each LED by pulse wide modulation (PWM) is provided, thereby preliminarily adjusting to supply electric power to each LED.

Otherwise, a reflect member (such as a mirror or the like) in which reflecting direction and reflectance ratio is known may be disposed to the reference position Q at which measurement site P is disposed, and correction factor of light intensity may be preliminarily stored for each light source based on the variation of light intensity detected with the camera 20 when each light source is sequentially switched and lighted. Then, during actual measurement, a measuring value (light intensity distribution) after correction on the basis of the correction factor is used to be measured.

By performing the adjustment as described above, occurrence of measurement error caused by variation of property of light sources can be prevented.

Shape Measuring Apparatus Z2 (Second Application Example)

Next, a shape measuring apparatus Z2 which is a second application example of the shape measuring apparatus Z will be described with reference to FIGS. 15A and 15B. Hereinafter, only different points as the shape measuring apparatus Z described above will be described as for the shape measuring apparatus Z2. Note that in FIGS. 15A and 15B, same reference numerals are used to designate the same elements shown in FIGS. 1A and 1B. Moreover, FIG. 15A is a plan view (a part of which is a block diagram) of the shape measuring apparatus Z2 and FIG. 15B is side view of the shape measuring apparatus Z2.

As shown in FIGS. 15A and 15B, the shape measuring apparatus Z2 includes the absolutely same elements as the shape measuring apparatus Z. However, the disposed positions of the LED 12 and the camera 20 in the light emitting device 10 of the shape measuring apparatus Z2 are different from that of the shape measuring apparatus Z.

As shown in FIGS. 1A and 1B, in the shape measuring apparatus Z, emitting portions of all LEDs 12 are disposed in one plane including the reference position Q and perpendicular to the surface of the wafer 1 (thin sample), that is, in the plane including a cross section of the thickness direction of the wafer 1 (thin sample) at the reference position Q (measurement site P).

On the other hand, as shown in FIG. 15B, in the shape measuring apparatus Z2, a lighting position of each LED 12 is positioned at one side and a disposed position of the camera 20 (an example of first light detecting means) is positioned at another side among both sides of the plane 50 including a cross section of thickness direction of the wafer 1 (thin sample) at the reference position Q (measurement site P). Note that the plane 50 includes the reference position Q (measurement site P) and approximately perpendicular to the plane of the both sides of the wafer 1 (thin sample).

Then, in the shape measuring apparatus Z2, the positional relationship between each LED 12 and the camera 20 when viewed from the direction perpendicular to the plane in which lighting positions of each LED 12 lies (FIG. 15A) is the same as the positional relationship therebetween in the shape measuring apparatus Z (FIG. 1A).

In such a shape measuring apparatus Z2, shape measuring (calculation of edge profile) of the measurement site P of the wafer 1 can also be performed by performing the same measurement and calculation as is performed by using the shape measuring apparatus Z. In addition, in the shape measuring apparatus Z2, even when the LEDs 12 are consecutively disposed in the face direction of the measurement site P, the LEDs 12 can be disposed so as not to interfere with the camera 20. Accordingly, spatial resolution of the surface shape measurement can be enhanced as for a part range of the face direction of the measurement site P.

Shape Measuring Apparatus Z3 (Third Application Example)

Next, shape measuring apparatus Z3 which is a third application example of the shape measuring apparatus Z will be described with reference to FIGS. 16A and 16B. Hereinafter, only different points as the shape measuring apparatus Z2 will be described for the shape measuring apparatus Z3. Note that in 16A and 16B, same reference numerals are used to designate the same elements shown in FIGS. 1A and 1B and FIGS. 15A and 15B. Moreover, FIG. 16A is a plan view (a port of which is a block diagram) of the shape measuring apparatus Z3 and FIG. 16B is side view of the shape measuring apparatus Z3.

As shown in FIGS. 16A and 16B, the shape measuring apparatus Z3 includes all constituent elements which are equipped in the shape measuring apparatus Z2 and the disposed positions of the LEDs 12 and the camera 20 in the light emitting device 10 are the same as that of the shape measuring apparatus Z2. Note that the camera 20 is a telecentric lens system camera.

In addition, the shape measuring apparatus Z3 includes a leaser light source 40 (an example of second light emitting means) which emits sheet light Ls (light of sheet form, also referred to as slit light) to the measuring site P (edge surface) of the wafer 1 and a laser driving circuit 41 which drives the leaser light source 40.

Here, the leaser light source 40 emits sheet light Ls in the plane 50 including the cross section of the thickness direction of the wafer 1 at the measurement site P, that is, including the reference position Q (measurement site P) and approximately perpendicular to the both surface of the wafer 1.

Therefore, in the shape measuring apparatus Z3, the lighting position of LED 12 in the light emitting device 10 is positioned at one side and the disposed position of the camera 20 (an example of first light detecting means) is positioned at another side respectively among both sides of the plane 50 including the sheet light Ls.

Further, the laser driving circuit 41 controls emitting and stopping of the sheet light Ls performed by the laser light source 40 in accordance with the control order from the calculator 30".

Then, the camera 20 detects a two-dimensional luminance distribution of the light emitted from the LED 12 and reflected at the measurement site P in the specular direction (an example of first light detecting means) and at the same time, detects a two-dimensional luminance distribution of the reflected light of the sheet light Ls emitted by the laser light source 40 and reflected at the measurement site P in a direction except the specular direction (an example of second light detecting means).

Further, the calculator 30" equipped in the shape measuring apparatus Z3 has a function to perform the same processing as the calculator 30 equipped in the shape measuring apparatuses Z1 and Z3, and further equipped with the function to perform a control program of the laser driving circuit 41 and the function to perform a shape calculating program with light cutting method. Note that the control program of the leaser driving circuit 41 and the shape calculating program with the light cutting method are preliminarily stored in the storage unit of the calculator 30".

That is, the calculator 30" has functions for which sheet light Ls is emitted to the measurement site P from the leaser light source 40 by controlling the leaser driving circuit 41, image data (two-dimensional luminance distribution data) of the reflected light form the measurement site P wile sheet light Ls is being emitted is downloaded through the camera 20, and the surface shape of the measurement site P is calculated by the calculation of known light cutting method based on the image data (an example of light cutting method shape calculating means).

FIG. 17A is a diagram schematically showing an example of a measurement site P(a) to which sheet light is being emitted, FIG. 17B is a diagram schematically showing an example of a measurement site P(b) to which sheet light is being emitted, and FIG. 17C is a diagram schematically showing an example of an image (c) of the measurement site P photographed by the camera 20. Moreover, FIG. 17A is a diagram in which the measurement site P is viewed from the direction perpendicular to the surface formed by the sheet light Ls and FIG. 17B is a diagram in which the measurement site P is viewed from the emitted direction of the sheet light Ls.

The sheet light Ls is in the plane 50 including a cross section of the thickness direction of the wafer 1 at the measurement site P as described above. Accordingly, the line CL0 shown by the sheet light Ls on the surface of the measurement site P becomes linear which follows just the outline (surface shape) of the cross section of the thickness direction of the wafer 1 at the measurement site P. Moreover, the line CL0 becomes approximately straight line as shown in FIG. 17B when the measurement site P is viewed from the emitting direction of the sheet light Ls.

On the other hand, when the measurement site P has a rough surface (not gloss surface), if the measurement site P at which sheet light Ls is being emitted is observed by the camera 20, as shown in FIG. 17C, the image of a high luminance portion formed by the reflected light of the sheet light Ls becomes linear image CL1 (hereinafter, referred to as image of light cutting line). The distribution of the coordinate in the Y axis direction of the image CL1 of the light cutting line (distribution in X axis direction) becomes a value corresponding to a surface height distribution in the thickness direction of the measurement site P.

To be more specific, as shown in FIG. 17, at the measurement site P, if a surface height of each position in the thickness direction is h when a surface height at the position which becomes a predetermined reference in the thickness direction (in FIG. 17A, boundary position between front surface and edge surface (side surface) of the wafer 1) is reference, a difference between Y coordinate of image CL1 of the light cutting line of the position corresponding to the position to be the reference and Y coordinate of the image CL1 of the light cutting line in each X coordinate in the image obtained by photographing the measurement site P with the camera 20 is $h_{ccd}$, an angle defined by the sheet light Ls and the reflected light which proceed from the measurement site P to the camera 20 is $\theta_x$, and a magnification ratio of the optical system of a route from the measurement site P to an image pickup device of the camera 20 is M, next equation (4) is given.

$$h = h_{ccd} / \{M \cdot \sin(\theta_x)\} \quad (4)$$

Accordingly, an edge profile (surface height distribution in the thickness direction) can be calculated by the calculator 30" by detecting the distribution of Y coordinate of the image CL1 of the light cutting line (distribution of $h_{ccd}$ at each position in X axis direction (thickness direction of the wafer 1)) base on the photographed image with the camera 20 and by substituting the detected value of Y coordinate into equation (4) and calculating the equation.

Next, measuring control procedures of the shape measuring apparatus Z3 will be described with reference to the flowchart shown in FIG. 18. The measuring control procedures shown in FIG. 18 are performed by the calculator 30". In particular, in the procedures, a state of the surface of the measurement site P is automatically discriminated and surface shape measurement is controlled to suit to the state of the surface. Hereinafter S21, S22, . . . shows identification codes of processing procedures (steps). Note that the process shown in FIG. 18 shall be started in the state where the measurement site P of the wafer 1 is disposed to the reference position Q.

Steps S21, S22

First, the calculator 30" makes a lesser source 40 to emit sheet light Ls to the measurement site P by controlling the lesser light source driving circuit 41 (S21).

Further, the calculator 30" performs photographing (shutter ON) of the measurement site P by the camera 20 while the sheet light Ls is being emitted and storing the photographed image (S22). The photographed image by the camera 20 is stored in the storage means such as a hard disc or the like equipped in the calculator 30".

Step S23

Next, based on the photographed image (corresponding to detected luminance with second light detecting means) photographed by the camera 20 while sheet light Ls is being emitted with the lesser light source 40, the calculator 3011 automatically discriminates that which one of a shape calculated result by light emitting angle changing system or a shape calculated result based on light cutting method is adopted for shape evaluation of the measurement site P (S23, an example of second adoption discrimination means)

Here, the shape calculated result by the light emitting angle changing system refers to a calculated result of a distribution of a surface angle of the measurement site P according to lighting control of the LED 12 and surface angle distribution calculation (S1 to S11) shown in FIG. 12.

To be more specific, the calculator 30" discriminate whether image CL1 (see FIG. 17C) of the light cutting line which is a continuing linear image (image formed by the pixels having a luminance not less than a predetermined luminance) in the range corresponding to the thickness of the wafer 1 in the X axis direction is included or not in the image photographed by the camera 20 while sheet light Ls is being emitted. Here, when the surface of the measurement site P is a rough surface, sheet light Ls is diffusely reflected at the measurement site P and the reflected light reaches the camera 20, so that image CL1 of the light cutting line appears in the image photographed by the camera 20. On the other hand, when the surface of the measurement site P is a gloss surface (mirror surface or the like), sheet light Ls is regularly reflected at the measurement site P and the reflected light does not reaches the camera 20, so that image CL1 of the light cutting line does not appears in the image photographed by the camera 20.

Then, when the calculator 30" discriminates that image CL1 of the light cutting line is included in the image photographed by the camera 20, the calculator 30" discriminates to adopt a calculated result of a surface shape of the measurement site P by a shape calculation based on light cutting method, and if not so, discriminates to adopt a shape calculated result by the light emitting angle changing system.

Step S24, S25

Then, when the calculator 30" discriminates to adopt a shape calculated result by the light emitting angle changing system, the calculator 30" performs calculation of an edge profile based on a distribution of the surface angle of the measurement site P, storages the calculated result and the like (S24) by performing lighting control of the LED 12 and the surface angle distribution calculation shown in FIG. 12 (S1 to S11), and finishes the measurement processes.

On the other hand, when the calculator 30" discriminates to adopt a shape calculated result based on the light cutting method, the calculator 30" performs calculation (surface shape calculation) of an edge profile at the measurement site P by the light cutting method based on the image (image data) photographed in step S22 and stores the calculated result (S25), and finishes the measurement processes. At this time, the calculator 30" displays the edge profile of the measurement site P on a display unit thereof as needed. To be more specific, the calculator 30" calculates a distribution of the surface height h (edge profile) in the thickness direction of the measurement site P based on the equation (4).

In this manner, the surface shape of the wafer 1 (thin sample) can be measured whether the edge surface thereof is a gloss surface or rough surface with the surface measuring device Z3. In addition, user is saved the trouble of changing over measurement content and calculation content in accordance with the state of the measurement site.

By the way, in the process in step S23 shown in FIG. 18 shows an discrimination example in which one of a shape calculated result by the light emitting angle changing system (calculated result of a surface angle distribution) or a shape calculated result based on the light cutting method is adopted for shape evaluation of the measurement site P based on an image (corresponding to a luminance detected by second light detecting means) photographed by the camera 20 while light is being emitted by the laser light source 40.

On the contrary, the calculator 30" (an example of first adoption discrimination means) may discriminate which one of a shape calculated result by the light emitting angle changing system (corresponding to the calculated result of a distribution of the surface angle of the site measured by surface angle distribution calculating means) or a shape calculated result based on light cutting method is adopted for shape evaluation of the measurement site P based on an image (detected luminance) photographed by the camera 20 while light is being emitted by the LED 12 in the light emitting device 10 (an example of first light detecting means) in step S23.

For example, it is preferable that the calculator 30" lights a predetermined one or a plurality of LEDs 12 in the light emitting device 10, discriminates whether the corresponding number of strip-shaped image (see FIG. 8B) as the position and number of the lighted LED 12 is included or not in an image (image based on a luminance detected by the first light detecting means) photographed by the camera 20 at that time, and discriminate to adopt which one of calculated results in accordance with the discriminated result.

When the measurement site P is a mirror surface, light of the LED 12 is regularly reflected at the measurement site P and the reflected light reaches the camera 20, so that a strip-shaped image which extends in the Y axis direction as shown by the high luminance portion in FIG. 8B appears. The number of the strip-shaped image is settled to a predetermined number in accordance with the position and the number of the lighted LED 12.

On the other hand, when the surface of the measurement site P is not yet polished and is a rough surface, the light of lighted LED 12 is diffusely reflected at the measurement site P and the reflected light does not reach the camera 20, so that the strip-shaped image does not appear in an image photographed by the camera 20.

Consequently, when the calculator 30" discriminates that the corresponding number of the strip-shaped image as the position and the number of the lighted LED 12 is included in an image photographed by the camera, the calculator 30" may discriminate to adopt a shape calculated result by the light emitting angle changing system, and if not so, may discriminate to adopt a calculated result of the surface shape of the measurement site P by shape calculation based on the light cutting method.

The shape measuring apparatus Z3 automatically changes over measurement content and calculation content in accordance with a state of the edge surface of the wafer 1 (thin sample) also when the process as described above is performed.

In addition, the laser light source 40 shown in FIGS. 16A and 16B is disposed to emit sheet light Ls in the plane 50 including a cross section of the thickness direction of the wafer 1 in the measurement site P but may be disposed to emit sheet light Ls in other plane. In this regard, when sheet light Ls is emitted in a plane except the plane 50, line CL0 shown by the sheet light Ls on a surface of the measurement site P becomes displaced linear with respect to an outline (surface shape) of the cross section of the thickness direction of the wafer 1 in the measurement site P. Consequently, the error between shape calculated result by the light emitting angle changing system and shape calculated result based on light cutting method becomes large as the misalignment of the surface including sheet light Ls with respect to the plane 50 becomes large.

Further, a camera which detects two-dimensional luminance (image) of reflected light of sheet light Ls may be provided separately from the camera 20 which detects luminance of reflected light of light of the LCD 12.

The present invention can be utilized for a shape measuring apparatus for a thin sample such as a semiconductor wafer, an aluminum substrate or a glass substrate for a hard disc, or the like.

What is claimed is:

1. A shape measuring apparatus for measuring a shape of an edge of a thin sample comprising:
   first light emitting means for emitting light at sequentially different emitting angles to a measurement site which is an edge surface of the thin sample by lighting a light source at each of a plurality of positions in one plane;
   first light detecting means for, at a predetermined position, detecting a one-dimensional or two-dimensional luminance distribution of light emitted by the first light emitting means at each of the sequentially different emitting angles and reflected from the measurement site in an approximately specular direction;

reflected light luminance obtaining means for obtaining a luminance distribution of the reflected light from the measurement site through the first light detecting means when light is emitted at each of the sequentially different emitting angles by the first light emitting means; and surface angle distribution calculating means for calculating a distribution of a surface angle of the measurement site based on luminance distributions of the reflected light obtained by the reflected light luminance obtaining means when light is emitted at the sequentially different emitting angles and the sequentially different emitting angles of the light emitted by the first light emitting means, wherein the surface angle distribution calculating means calculates a surface angle of the measurement site at each calculating object position in a light detecting range of the first light detecting means by performing a calculation for estimating an emitting angle of the light when luminance of the reflected light is peak, based on a relationship between each emitting angle of the light and luminance of the reflected light.

2. The shape measuring apparatus according to claim 1, further comprising:

a plurality of the first light detecting means each disposed in a different direction to the measurement site wherein the surface angle distribution calculating means calculates a distribution of the surface angle of a part region of the measurement site based on the luminance distribution of the reflected light and the emitting angle of the light for each luminance distribution of the reflected light obtained through each of the plurality of the first light detecting means; and combining calculation means for calculating a distribution of the surface angles or a surface shape of the whole measurement site by combining each calculated result of the distribution of the surface angle of the part region calculated by the surface angle distribution calculating means or each surface shape of the measurement site based on the calculated result.

3. The shape measuring apparatus according to claim 2, wherein two of the first light detecting means are disposed in directions making approximately 90° to the measurement site.

4. The shape measuring apparatus according to claim 2, wherein in the process of sequentially switching and lighting the plurality of light sources with the switch type light emitting means, a plurality of light sources corresponding to each of the plurality of the first light detecting means are simultaneously lighted.

5. The shape measuring apparatus according to claim 1, further comprising:

second light emitting means for emitting sheet light to the measurement site;

second light detecting means for detecting a two-dimensional luminance distribution of the light emitted by the second light emitting means and reflected at the measurement site in a direction except the specular direction; and light cutting method shape calculating means for calculating a surface shape of the measuring site by calculation of a light cutting method on the basis of a result detected by the second light detecting means.

6. The shape measuring apparatus according to claim 5, wherein the first light detecting means which detects a two-dimensional luminance distribution doubles as the second light detecting means.

7. The shape measuring apparatus according to claim 5, wherein the second light emitting means emit sheet light in a plane including a cross section of the thickness direction of the thin sample in the measurement site, and a lighting position of the light source of the first light emitting means is positioned at one side and a disposed position of the first light detecting means is positioned at another side among both sides of the plane including the sheet light.

8. The shape measuring apparatus according to claim 5, further comprising first adoption discrimination means which discriminates that which one of a calculated result of the distribution of the surface angle of the measurement site calculated by the surface angle distribution calculating means or a calculated result of the surface shape of the measurement site calculated by the light cutting method shape calculating means is adopted for shape evaluation of the measurement site based on a luminance detected by the first light detecting means while light is being emitted by the first light emitting means.

9. The shape measuring apparatus according to claim 8, wherein the first adoption discrimination means discriminates that which one of the calculated results is adapted according to whether a predetermined number of strip-shaped image is included or not in the image based on the luminance detected by the first light detecting means while the one or the plurality of light sources of the first light emitting means is being lighted.

10. The shape measuring apparatus according to claim 5, further comprising second adoption discrimination means which discriminates that which one of a calculated result of the distribution of the surface angle of the measurement site calculated by the surface angle distribution calculating means or a calculated result of the surface shape of the measurement site calculated by the light cutting method shape calculating means is adopted for shape evaluation of the measurement site based on a luminance detected by the second light detecting means while light is being emitted by the second light emitting means.

11. The shape measuring apparatus according to claim 10, wherein the second adoption discrimination means discriminates that which one of the calculated results is adapted according to whether a continuing linear image is included or not in a predetermined range in the image based on the luminance detected by the second light detecting means while sheet light is being emitted by the second light emitting means.

12. A shape measuring apparatus for measuring a shape of an edge of a thin sample comprising:

first light emitting means for emitting light at sequentially different emitting angles to a measurement site which is an edge surface of the thin sample by lighting a light source at each of a plurality of positions in one plane;

first light detecting means for, at a predetermined position, detecting a one-dimensional or two-dimensional luminance distribution of light emitted by the first light emitting means at each of the sequentially different emitting angles and reflected from the measurement site in an approximately specular direction;

reflected light luminance obtaining means for obtaining a luminance distribution of the reflected light from the measurement site through the first light detecting means when light is emitted at each of the sequentially different emitting angles by the first light emitting means; and surface angle distribution calculating means for calculating a distribution of a surface angle of the measurement site based on luminance distributions of the reflected light obtained by the reflected light luminance obtaining means when light is emitted at the sequentially different emitting angles and the sequentially different emitting angles of the light emitted by the first light emitting means, wherein the surface angle distribution calculating means calculates a surface angle of the measurement site at each of calculating object positions in a light detecting range of the first light detecting means by performing a calculation for estimating an emitting angle of the light when luminance of the reflected light is peak, based on a relationship between each emitting angle of the light and luminance of the reflected light, and wherein the first light emitting means is a movable type light emitting means which emits light at the sequentially different angles to the measurement site by sequentially moving the light source to each of the plurality of positions in the one plane and lighting the light source.

13. A shape measuring apparatus for measuring a shape of an edge of a thin sample comprising:

first light emitting means for emitting light at sequentially different emitting angles to a measurement site which is an edge surface of the thin sample by lighting a light source at each of a plurality of positions in one plane;

first light detecting means for, at a predetermined position, detecting a one-dimensional or two-dimensional luminance distribution of light emitted by the first light emitting means at each of the sequentially different emitting angles and reflected from the measurement site in an approximately specular direction;

reflected light luminance obtaining means for obtaining a luminance distribution of the reflected light from the measurement site through the first light detecting means when light is emitted at each of the sequentially different emitting angles by the first light emitting means; and surface angle distribution calculating means for calculating a distribution of a surface angle of the measurement site based on luminance distributions of the reflected light obtained by the reflected light luminance obtaining means when light is emitted at the sequentially different emitting angles and the sequentially different emitting angles of the light emitted by the first light emitting means, wherein the surface angle distribution calculating means calculates a surface angle of the measurement site at each of calculating object positions in a light detecting range of the first light detecting means by performing a calculation for estimating an emitting angle of the light when luminance of the reflected light is peak, based on a relationship between each emitting angle of the light and luminance of the reflected light, and wherein the first light emitting means is a switch type light emitting means which emits light at the sequentially different angles to the measurement site by sequentially switching and lighting a plurality of light sources each disposed at each of the plurality of positions in the one plane.

14. The shape measuring apparatus according to claim 13, wherein the plurality of light sources in the switch type light emitting means are disposed on a circular arc, and the measurement site is disposed at the center of the circular arc.

15. A shape measuring method for measuring a shape of an edge of a thin sample comprising:

a first light emitting process for emitting light at sequentially different emitting angles to a measuring site which is an edge surface of a thin sample;

a first light detecting process for, at a predetermined position, detecting a one-dimensional or two-dimensional luminance distribution of light emitted in the first light emitting process and reflected from the measurement site in an approximately specular direction by light detecting means;

a reflected light luminance obtaining process for obtaining a luminance distribution of the reflected light from the measurement site by performing the first light detecting process when light is emitted at each of the sequentially different emitting angles in the first light emitting process; and a surface angle distribution calculating process for calculating a distribution of a surface angle of the measurement site based on the luminance distributions of the reflected light obtained by the reflected light luminance obtaining process and the emitting angles of the light emitted in the first light emitting process.

16. The shape measuring method according to claim 15, further comprising:

a second light emitting process for emitting sheet light to the measurement site by predetermined light emitting means;

a second light detecting process for detecting a two-dimensional luminance distribution of the light emitted in the second light emitting process and reflected at the measurement site in a direction except the specular direction by light detecting means; and a light cutting method shape calculating process for calculating a surface shape of the measurement site by calculation of a light cutting method based on a result detected in the second light detecting process.

17. The shape measuring method according to claim 16, further comprising a first adoption discrimination process which determines which of a calculated result of the distribution of the surface angle of the measurement site calculated in the surface angle distribution calculating process or a calculated result of the surface shape of the measurement site calculated in the light cutting method shape calculating process is adopted for shape evaluation of the measurement site based on a luminance detected in the first light detecting process while light is being emitted in the first light emitting process.

18. The shape measuring method according to claim 16, further comprising a second adoption discrimination process which determines which of a calculated result of the distribution of the surface angle of the measurement site calculated in the surface angle distribution calculating process or a calculated result of the surface shape of the measurement site calculated in the light cutting method shape calculating process is adopted for shape evaluation of the measurement site based on a luminance detected in the second light detecting process while light is being emitted in the second light emitting process.

* * * * *